US012135557B2

(12) United States Patent
Nishii et al.

(10) Patent No.: US 12,135,557 B2
(45) Date of Patent: Nov. 5, 2024

(54) PATH GENERATION SYSTEM

(71) Applicant: Yanmar Power Technology Co., Ltd., Osaka (JP)

(72) Inventors: Yasuto Nishii, Osaka (JP); Kohei Ogura, Osaka (JP); Nobuhiro Kimura, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 476 days.

(21) Appl. No.: 17/438,917

(22) PCT Filed: Jan. 17, 2020

(86) PCT No.: PCT/JP2020/001482
§ 371 (c)(1),
(2) Date: May 6, 2022

(87) PCT Pub. No.: WO2020/183906
PCT Pub. Date: Sep. 17, 2020

(65) Prior Publication Data
US 2022/0269278 A1 Aug. 25, 2022

(30) Foreign Application Priority Data
Mar. 14, 2019 (JP) ................................. 2019-047446

(51) Int. Cl.
*G05D 1/02* (2020.01)
*A01B 69/04* (2006.01)
(Continued)

(52) U.S. Cl.
CPC ......... *G05D 1/0219* (2013.01); *A01B 69/008* (2013.01)

(58) Field of Classification Search
CPC ...... A01B 69/008; E02F 9/2045; E02F 9/205; G05D 1/0219; G06F 3/04847; G06F 3/0488
See application file for complete search history.

(56) References Cited

U.S. PATENT DOCUMENTS 6,142,252 A * 11/2000 Kinto .................. G05D 1/0219
180/274
10,705,533 B1 * 7/2020 Bishel ................. G05D 1/0255
(Continued)

FOREIGN PATENT DOCUMENTS

| JP | 2016-095658 A | 5/2016 |
| JP | 2016-181015 A | 10/2016 |
| WO | 2017110116 A1 | 6/2017 |

OTHER PUBLICATIONS

International Search Report dated Mar. 10, 2020 issued in corresponding PCT Application PCT/JP2020/001482.

*Primary Examiner* — Tyler J Lee
(74) *Attorney, Agent, or Firm* — NORTON ROSE FULBRIGHT US LLP

(57) ABSTRACT

The present invention enables generating a desired target travel path intended by a user or the like without the need for various input works for the type, width, and the like of a work machine. The present invention is provided with: a travel path generation unit which generates a target travel path (P) along which a work vehicle is caused to travel automatically; and a reference point setting unit which, on the basis of position information about the work vehicle when the work vehicle has been caused to travel, sets a first reference point (A) and a second reference point (B) for generating a first reference line, and a third reference point (C) for setting intervals, wherein the path generation unit generates, as the target travel path (P), a path that includes a plurality of parallel paths (P2) parallel to the first reference (Continued)

line (P1) based on the first reference point (A) and the second reference point (B), and sets respective intervals between the first reference line (P1) and the parallel paths (P2) and also each interval between the parallel paths (P2), on the basis of a distance between the second reference point (B) and the third reference point (C).

12 Claims, 16 Drawing Sheets

(51) Int. Cl.
*A01B 69/08* (2006.01)
*G05D 1/00* (2006.01)

(56) References Cited

U.S. PATENT DOCUMENTS

| | | | |
|---|---|---|---|
| 11,516,963 B2 * | 12/2022 | Manji | A01D 34/008 |
| 2009/0228166 A1 * | 9/2009 | Durkos | G05D 1/0219 |
| | | | 701/26 |
| 2011/0125358 A1 * | 5/2011 | Biber | G05D 1/0272 |
| | | | 701/25 |
| 2020/0064144 A1 * | 2/2020 | Tomita | A01B 79/005 |
| 2020/0064863 A1 * | 2/2020 | Tomita | A01B 69/00 |

* cited by examiner

PATH GENERATION SYSTEM

CROSS-REFERENCE TO RELATED APPLICATIONS

This application is a national stage application pursuant to 35 U.S.C. § 371 of International Application No. PCT/JP2020/001482, filed on Jan. 17, 2020 which claims priority under 35 U.S.C. § 119 to Japanese Patent Application No. 2019-047446 filed on Mar. 14, 2019, the disclosures of which are hereby incorporated by reference in their entireties.

TECHNICAL FIELD

The present invention relates to a path generation system that generates a target travel path on which a work vehicle is cause to automatically travel.

BACKGROUND ART

The above-mentioned path generation system is used in an automatic traveling system in which a current position of a work vehicle is acquired using a satellite navigation system and the work vehicle is caused to automatically travel along a target travel path generated by the path generation system (see, for example, Patent Document 1).

In a system described in Patent Document 1, various types of information, such as a type, a width, or the like of a work machine to be mounted on a work vehicle, are input to a remote-control terminal, such as a personal computer or the like, and a target travel path is generated based on the input information. The target travel path includes, for example, a plurality of linear paths arranged in parallel and a plurality of connecting paths connecting adjacent linear paths.

CITATION LIST

Patent Literature

Patent Document 1: Japanese Unexamined Patent Application Publication No. 2016-95658

DISCLOSURE OF INVENTION

Problems to be Solved by the Invention

In the system described in Patent Document 1, it is necessary to perform an input work of inputting various types of information, such as a type, a width, or the like of a work machine, in order to generate a target travel path. Therefore, when starting a work by automatic traveling, it is necessary to perform the input work for various types of information, and therefore, the work cannot be started smoothly and a work efficiency is lowered.

A reference path is also generated based on a movement locus or the like when a user or the like drives and operates the work vehicle to cause the work vehicle to actually travel, and a target travel path corresponding to the reference path is generated. In this case, for example, by generating a plurality of parallel paths arranged in parallel to the reference path and generating a plurality of connecting paths each connecting the reference path and one of the parallel paths that are adjacent to each other or adjacent ones of the parallel paths, a target travel path including the reference path, the parallel paths, and the connecting paths is generated.

However, even in this case, the information, such as the type, the width, or the like of the work machine, is required to set an interval between adjacent ones of the parallel paths, and therefore, the user or the like needs to input the information. Furthermore, even when the information is input, there is a possibility that the interval between adjacent ones of the parallel paths cannot be set to a desired interval intended by the user or the like.

In view of this situation, it is a main object of the present invention to provide a path generation system capable of generating a desired target travel path intended by a user or the like without requiring an input work for various types of information, such as a type, a width, or the like of a work machine.

Means for Solving the Problems

A first feature configuration of the present invention includes a travel path generation section that generates a target travel path on which a work vehicle is caused to automatically travel, and a reference point setting section that sets a first reference point and a second reference point used for generating a first reference line and a third reference point used for setting intervals, based on position information of the work vehicle when the work vehicle is caused to travel, and the travel path generation section generates, as the target travel path, a path including a plurality of parallel paths parallel to the first reference line based on the first reference point and the second reference point and sets an interval between the first reference line and one of the parallel paths and an interval between the parallel paths, based on a distance between the second reference point and the third reference point.

According to this configuration, when a user or the like causes the work vehicle to travel, the first to third reference points can be set by the reference point setting section. The travel path generation section not only generates the plurality of parallel paths parallel to the first reference line based on the first reference point and the second reference point but also sets the interval between the first reference line and one of the parallel paths and the interval between the parallel paths, based on the distance between the second reference point and the third reference point. Thus, even when the user or the like does not perform an input work for various types of information, such as a type, a width, or the like of a work device, the target travel path can be generated only by setting the first to third reference points. Moreover, the first to third reference points can be set when the user or the like causes the work vehicle to travel, and therefore, a desired target travel path having path lengths of the parallel paths, an interval between adjacent ones of the parallel paths, or the like that are intended by the user or the like can be generated.

In a second feature configuration of the present invention, the reference point setting section sets, based on an operation of an operation tool provided in the work vehicle, the first reference point, the second reference point, and the third reference point.

According to this configuration, when the user or the like operates the operation tool, the reference point setting section can set the first to third reference points in accordance with the operation. Thus, a desired target travel path intended by the user or the like can be appropriately generated only by operating the operation tool at a point intended by the user or the like, resulting in an increase in usability.

In a third feature configuration of the present invention, the reference point setting section sets, based on a behavior state of the work vehicle, the first reference point, the second reference point, and the third reference point.

According to this configuration, the reference point setting section can automatically set the first to third reference points in accordance with the behavioral state of the work vehicle, so that no operation by the user or the like is required and the target travel path can be appropriately generated while a work load on the user and the like is reduced.

A fourth feature configuration of the present invention includes a work area information acquisition section that acquires work area information related to a work area to which the first reference point, the second reference point, and the third reference point belong, and the travel path generation section generates the target travel path in a work area specified by the work area information acquired by the work area information acquisition section.

According to this configuration, the travel path generation section generates the target travel path in the work area considering not only the first to third reference points but also the work area information related to the work area to which the first to third reference points acquired by the work area information acquisition section belong, and therefore, can generate an appropriate target travel path that does not deviate from the work area. Moreover, the work area information can be acquired by the work area information acquisition section without performing a work in which the user or the like registers information, and therefore, the work load on the user or the like can be reduced.

A fifth feature configuration of the present invention includes a notification position specification section that specifies, based on the first reference point, the second reference point, and the work area information, a notification position where end notification of notifying that the work vehicle is in an approach state with respect to an end of the work area is performed, and an end notification control section that, in a case where the work vehicle automatically travels, when a current position of the work vehicle reaches the notification position, performs the end notification.

According to this configuration, the notification position specification section specifies the notification position where the end notification is performed based on not only the first reference point and the second reference point but also the work area information, and therefore, the notification position in accordance with a situation of the work area, such as a shape of the work area or the like, can be specified. Thus, in a case where the work vehicle automatically travels, the end notification control section can perform the end notification at an appropriate notification position, so that the user or the like can be notified that the work vehicle is in the approach state at an appropriate timing. Therefore, the occurrence of inconveniences, such as jumping out of the work vehicle to outside of the work area or the like, can be prevented.

In a sixth feature configuration of the present invention, the reference point setting section is capable of setting a fourth reference point used for generating a second reference line different from the first reference line, based on the position information of the work vehicle when the work vehicle is caused to travel, and the travel path generation section selects one of the first reference line and the second reference line when a predetermined condition is satisfied, and generates, as the target travel path, a path including an additional path parallel to the one of the first reference line and the second reference line selected based on a current position of the work vehicle.

According to this configuration, by setting the fourth reference point by the reference point setting section, the travel path generation section can select not only the first reference line but also the second reference line, and generate an additional path corresponding to the first reference line or the second reference line. Thus, an additional path corresponding to the first reference line or an additional path corresponding to the second reference line can be generated in accordance with various situations, such as the situation of the work area or the like, and therefore, the work vehicle can be caused to automatically travel in accordance with various situations without requiring various input works for a type, a width, or the like of a work machine.

DESCRIPTION OF EMBODIMENTS

Embodiments of an automatic traveling system to which a path generation system according to the present invention is applied will be described with reference to the drawings.

First Embodiment

Figure 1:
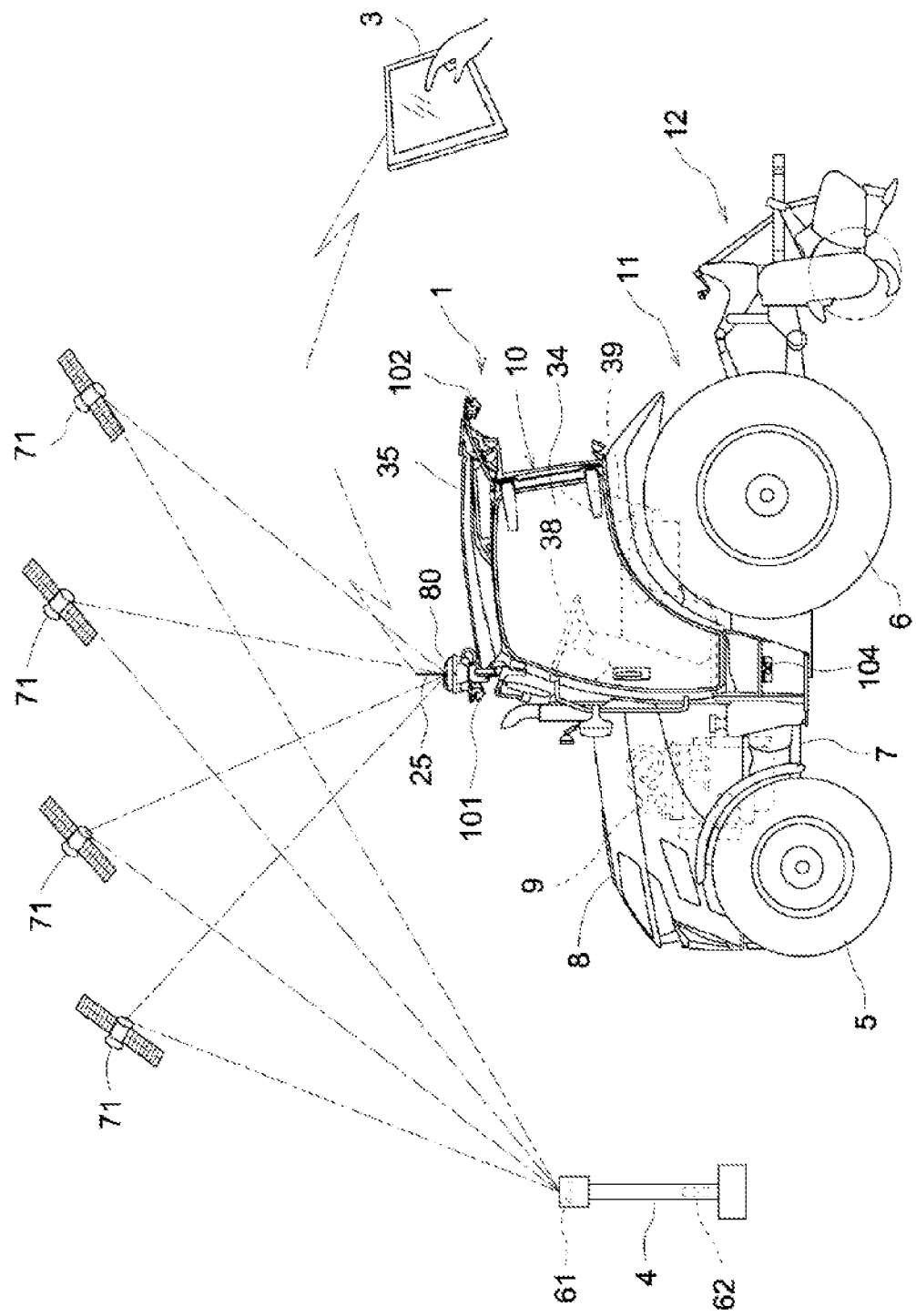
FIG. 1 is a diagram illustrating a schematic configuration of an automatic traveling system.

As illustrated in FIG. 1, the automatic traveling system uses a tractor 1 as a work vehicle, but the automatic traveling system is applicable to, in addition to a tractor, a passenger work vehicle, such as a passenger rice transplanter, a combine, a passenger mower, a wheel loader, a snowplow, or the like, and an unmanned work vehicle, such as an unmanned mower or the like.

Figure 2:
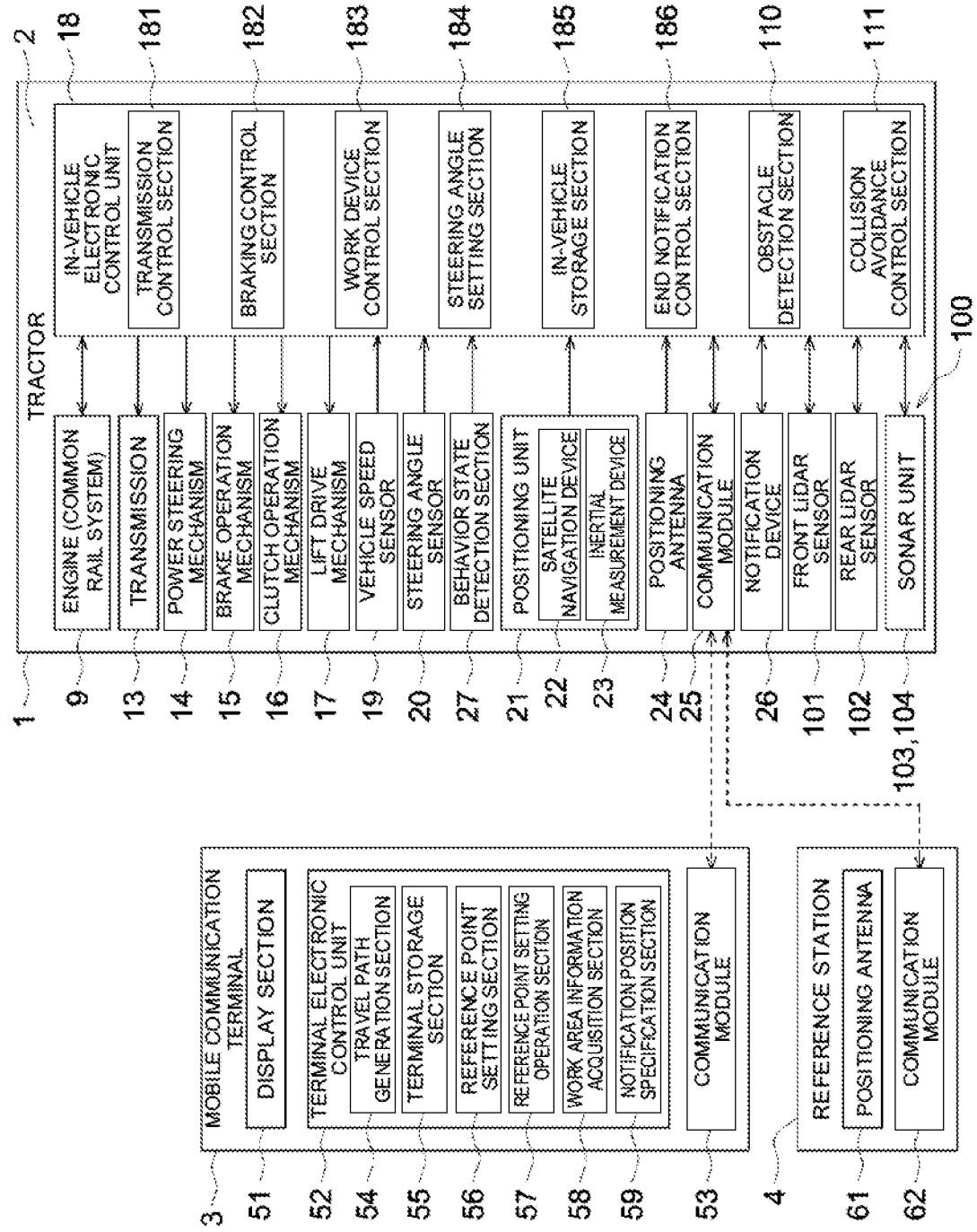
FIG. 2 is a block diagram illustrating the schematic configuration of the automatic traveling system.

As illustrated in FIG. 1 and FIG. 2, the automatic traveling system includes an automatic traveling unit 2 mounted on the tractor 1 and a mobile communication terminal 3 communicably set to be communicate with the automatic traveling unit 2. As the mobile communication terminal 3, a tablet personal computer, a smartphone, or the like having a touch-operable touch panel type display section 51 (for example, a liquid crystal panel) or the like can be employed.

The tractor 1 includes a traveling machine body 7 including left and right front wheels 5 functioning as steering wheels that can be driven and left and right rear wheels 6 that can be driven. A bonnet 8 is arranged in front of the traveling machine body 7, and an electronically controlled diesel engine (which will be hereinafter referred to as an engine) 9 including a common rail system is provided in the bonnet 8. A cabin 10 forming a boarding-type driving unit is provided behind the bonnet 8 of the traveling machine body 7.

A rotary tilling device that is an example of a work device 12 can be connected to a rear portion of the traveling machine body 7 via a three-point link mechanism 11 so as to move up and down and roll. In place of the rotary tilling device, various work devices 12, such as a mower, a plow, a sowing device, a spraying device, or the like, can be connected to the rear portion of the tractor 1.

As illustrated in FIG. 2, the tractor 1 includes an electronically controlled transmission 13 that shifts power from the engine 9, a fully hydraulic power steering mechanism 14 that steers the left and right front wheels 5, left and right side brakes (not illustrated) that brake the left and right rear wheels 6, electronically controlled brake operation mechanism 15 that enables hydraulic operations of the left and right side brakes, a work clutch (not illustrated) that intermittently transmits power to the work device 12, such as the rotary tilling device or the like, an electronically controlled clutch operation mechanism 16 that enables a hydraulic operation of the work clutch, an electrohydraulic control type lift drive mechanism 17 that moves the work device 12, such as the rotary tilling device or the like, up and down, an in-vehicle electronic control unit 18 having various control programs related to automatic driving or the like of the tractor 1, a vehicle speed sensor 19 that detects vehicle speed of the tractor 1, a steering angle sensor 20 that detects a steering angle of the front wheels 5, a positioning unit 21 that measures a current position and a current orientation of the tractor 1, and the like.

Note that, as the engine 9, an electronically controlled gasoline engine including an electronic governor may be employed. As the transmission 13, a hydraulic mechanical continuously variable transmission (HMT), a hydrostatic continuously variable transmission (HST), a belt type continuously variable transmission, or the like can be employed. As the power steering mechanism 14, an electric power steering mechanism 14 or the like including an electric motor may be employed.

Inside the cabin 10, as illustrated in FIG. 1, a steering wheel 38 that enables manual steering of the left and right front wheels 5 via the power steering mechanism 14 (see FIG. 2), a driver's seat 39 for a passenger, a touch panel type display section, various operation tools, and the like are provided.

As illustrated in FIG. 2, the in-vehicle electronic control unit 18 includes a transmission control section 181 that controls an operation of the transmission 13, a braking control section 182 that controls an operation of the left and right side brakes, a work device control section 183 that controls an operation of the work device 12, such as the rotary tilling device or the like, a steering angle setting section 184 that sets target steering angles of the left and right front wheels 5 during automatic traveling and outputs the target steering angles to the power steering mechanism 14, a non-volatile in-vehicle storage section 185 that stores a generated target travel path P (see, for example, FIG. 6) or the like for automatic traveling, and the like.

As illustrated in FIG. 2, the positioning unit 21 includes a satellite navigation device 22 that measures the current position and the current orientation of the tractor 1 using a global positioning system (GPS) that is an example of a navigation satellite system (NSS), an inertial measurement device (IMU) 23 that includes a 3-axis gyroscope, a 3-direction acceleration sensor, or the like and measures an attitude and the orientation of the tractor 1 or the like, and the like. Positioning methods using GPS include a differential GPS (DGPS) (relative positioning system), a real time kinematic GPS (RTK-GPS) (interference positioning system), or the like. In this embodiment, RTK-GPS suitable for positioning of a moving body is employed. Therefore, as illustrated in FIG. 1 and FIG. 2, a reference station 4 that enables positioning by RTK-GPS is installed in a known position around a rice field.

As illustrated in FIG. 2, the tractor 1 and the reference station 4 include positioning antennas 24 and 61, respectively, that receive radio waves transmitted from the positioning satellite 71 (see FIG. 1) and communication modules 25 and 62, respectively, that enable wireless communication of various types of information including positioning information (correction information) between the tractor 1 and the reference station 4, and the like. Thus, in the satellite navigation device 22, based on the positioning information obtained by the positioning antenna 24 on a tractor side by receiving the radio waves from the positioning satellite 71 and the positioning information obtained by the positioning antenna 61 on a base station side by receiving the radio waves from the positioning satellite 71 (correction information used for measuring the current position of the tractor 1), the current position and the current orientation of the tractor 1 can be measured with high accuracy. Moreover, the positioning unit 21 includes the satellite navigation device 22 and the inertial measurement device 23, and thus can measure the current position, the current direction, and the attitude angle (yaw angle, roll angle, pitch angle) of the tractor 1 with high accuracy.

The positioning antenna 24, the communication module 25, and the inertial measurement device 23 provided in the tractor 1 are housed in an antenna unit 80 as illustrated in FIG. 1. The antenna unit 80 is arranged in an upper position on a front side of the cabin 10.

As illustrated in FIG. 2, the mobile communication terminal 3 includes a communication module 53 that enables wireless communication of various types of information including positioning information or the like with a terminal electronic control unit 52 having various control programs that controls an operation of the display section 51 or the like, a communication module 25 on the tractor side, or the like. The terminal electronic control unit 52 includes a travel path generation section 54 that generates the target travel path P (see, for example, FIG. 6) used for causing the tractor 1 to automatically travel and a non-volatile terminal storage section 55 that stores various types of input information input by the user and the target travel path P or the like generated by the travel path generation section 54, or the like.

A method for generating the target travel path P by the travel path generation section 54 will be described later. The target travel path P generated by the travel path generation section 54 can be displayed on the display section 51 and is stored as path information in the terminal storage section 55. The path information includes an orientation angle of the target travel path P, a set engine rotation speed set in accordance with a traveling mode of the tractor 1 on the target travel path P, a target traveling speed, or the like.

When the travel path generation section 54 generates the target travel path P in the above-described manner, the terminal electronic control unit 52 transfers the path information from the mobile communication terminal 3 to the tractor 1, so that the in-vehicle electronic control unit 18 of the tractor 1 can acquire the path information. The in-vehicle electronic control unit 18 can cause the tractor 1 to automatically travel along the target travel path P while acquiring its own current position (current position of the tractor 1) by the positioning unit 21, based on the acquired path information. The current position of the tractor 1 acquired by the positioning unit 21 is transmitted from the tractor 1 to the mobile communication terminal 3 in real time (for example, in a cycle of several milliseconds), and the current position of the tractor 1 is known by the mobile communication terminal 3.

In a case of performing automatic traveling of the tractor 1, when various automatic traveling start conditions are satisfied, the user operates the display section 51 via the mobile communication terminal 3 to instruct a start of automatic traveling. The in-vehicle electronic control unit 18 receives an instruction of a start of automatic traveling, and thus, performs automatic travel control in which the tractor 1 is caused to automatically travel along the target travel path P while acquiring its own current position (current position of the tractor 1) by the positioning unit 21. The in-vehicle electronic control unit 18 is configured as an automatic travel control unit that performs automatic travel control in which the tractor 1 is caused to automatically travel along the target travel path P, based on the positioning information of the tractor 1 acquired by the positioning unit 21 using the satellite navigation system.

The automatic travel control includes automatic transmission control for automatically controlling an operation of the transmission 13, automatic braking control for automatically controlling an operation of the brake operation mechanism 15, automatic steering control for automatically steering the left and right front wheels 5, automatic control for work for automatically controlling an operation of the work device 12, such as a rotary tilling device, or the like.

In the automatic transmission control, the transmission control section 181 automatically controls an operation of the transmission 13 such that the target traveling speed set in accordance with the traveling mode of the tractor 1 on the target travel path or the like is obtained as the vehicle speed of the tractor 1, based on the path information of the target travel path P including the target travelling speed, an output of the positioning unit 21, and an output of the vehicle speed sensor 19.

In the automatic braking control, the braking control section 182 automatically controls an operation of the brake operation mechanism 15 such that the left side and right side brakes properly brake the left and right rear wheels 6 in a braking area included in the path information of the target travel path P, based on the target travel path P and the output of the positioning unit 21.

In automatic steering control, the steering angle setting section 184 calculates and sets the target steering angles of the left and right front wheels 5, based on the path information of the target travel path P and the output of the positioning unit 21, and outputs the set target steering angles to the power steering mechanism 14 such that the tractor 1 automatically travels on the target travel path P. The power steering mechanism 14 automatically steers the left and right front wheels 5, based on the target steering angles and the output of the steering angle sensor 20, such that the target steering angles are obtained as the steering angles of the left and right front wheels 5.

In automatic control for work, the work device control section 183 automatically controls operations of the clutch operation mechanism 16 and the lift drive mechanism 17, based on the path information of the target travel path P and the output of the positioning unit 21, such that, when the tractor 1 reaches a work start point of the target travel path P, a predetermined work (for example, a tilling work) by the work device 12 is started and, when the tractor 1 reaches a work end point of the target travel path P, the predetermined work by the work device 12 is stopped.

As escribed above, in the tractor 1, the automatic traveling unit 2 is constituted by the transmission 13, the power steering mechanism 14, the brake operation mechanism 15, the clutch operation mechanism 16, the lift drive mechanism 17, the in-vehicle electronic control unit 18, the vehicle speed sensor 19, the steering angle sensor 20, the positioning unit 21, the communication module 25, and the like.

In this embodiment, it is possible not only to cause the tractor 1 to automatically travel without the user or the like boarding the cabin 10 but also to cause the tractor 1 to automatically travel with the user or the like boarding the cabin 10. Therefore, not only the tractor 1 can be caused to automatically travel along the target travel path P by automatic travel control by the in-vehicle electronic control unit 18 without the user or the like boarding the cabin 10, but also the tractor 1 can be caused to automatically travel along the target travel path P by automatic travel control by the in-vehicle electronic control unit 18 even in a case where the user or the like is on board the cabin 10.

In a case where the user or the like is on board the cabin 10, an automatic traveling state where the tractor 1 is caused to automatically travel by the in-vehicle electronic control unit 18 and a manual traveling state where the tractor 1 is caused to travel, based on an operation of the user or the like, can be switched from one to another. Therefore, it is possible to switch from the automatic traveling state to the manual traveling state while the tractor 1 is automatically traveling on the target travel path P in the automatic traveling state and, conversely, it is possible to switch from the manual traveling state to the automatic traveling state while the tractor 1 is traveling in the manual traveling state. As for switching between the manual traveling state and the automatic traveling state, for example, a switching operation unit used for switching between the automatic traveling state and the manual traveling state from one to another can be provided in vicinity of the driver's seat 39, and the switching operation unit can be displayed on the display section 51 of the mobile communication terminal 3. Furthermore, when the user operates the steering wheel 38 during automatic driving control by the in-vehicle electronic control unit 18, the automatic driving state can be switched to the manual driving state.

As illustrated in FIG. 1 and FIG. 2, the tractor 1 includes an obstacle detection system 100 that detects an obstacle around the tractor 1 (traveling machine body 7) and avoids a collision with the obstacle. The obstacle detection system 100 includes a plurality of LiDAR sensors 101 and 102 capable of measuring a distance to a measurement target in three dimensions using a laser and a plurality of sonar units 103 and 104 including sonars capable of measuring the distance to the measurement target using ultrasonic waves, an obstacle detection section 110, and a collision avoidance control section 111.

The measurement targets measured by the LiDAR sensors 101 and 102 and the sonar units 103 and 104 are objects, people, and the like. As the LiDAR sensors 101 and 102, a front LiDAR sensor 101 whose measurement target is a front side of the tractor 1 and a rear LiDAR sensor 102 whose measurement target is a rear side of the tractor 1 are provided. As the sonar units 103 and 104, a right sonar unit 103 whose measurement target is a right side of the tractor 1 and a left sonar unit 104 whose measurement target is a left side of the tractor 1 are provided.

The obstacle detection section 110 is configured to perform obstacle detection processing of detecting a measurement target, such as an object, a person, or the like, in a predetermined distance as an obstacle, based on measurement information of the LiDAR sensors 101 and 102 and the sonar units 103 and 104. The collision avoidance control section 111 is configured to, when the obstacle detection section 110 detects an obstacle, perform collision avoidance control of decelerating the tractor 1 or stopping traveling of the tractor 1. In the collision avoidance control, the collision avoidance control section 111 not only decelerates the tractor 1 or stops traveling of the tractor 1 but also operates a notification device 26, such as a notification buzzer, a notification lamp, or the like, to notify that an obstacle exists. In the collision avoidance control, the collision avoidance control section 111 communicates with the mobile communication terminal 3 from the tractor 1 using the communication modules 25 and 53 to display the existence of the obstacle on the display section 51 and thus can notify that the obstacle exists.

The obstacle detection section 110 repeatedly performs obstacle detection processing based on the measurement information of the LiDAR sensors 101 and 102 and the sonar units 103 and 104 in real time to appropriately detect obstacles, such as objects, people, or the like. The collision avoidance control section 111 performs collision avoidance control for avoiding a collision with an obstacle detected in real time.

The obstacle detection section 110 and the collision avoidance control section 111 are provided in the in-vehicle electronic control unit 18. The in-vehicle electronic control unit 18 is communicably connected to the electronic control unit for the engine provided in the common rail system, the LiDAR sensors 101 and 102, the sonar units 103 and 104, or the like via a controller area network (CAN).

Hereinafter, a method for generating the target travel path P by the travel path generation section 54 will be described. The user or the like performs a driving operation to cause the tractor 1 to travel in the work area R and thus actually perform a work, and thus, the travel path generation section 54 generates the target travel path P.

Figure 3:
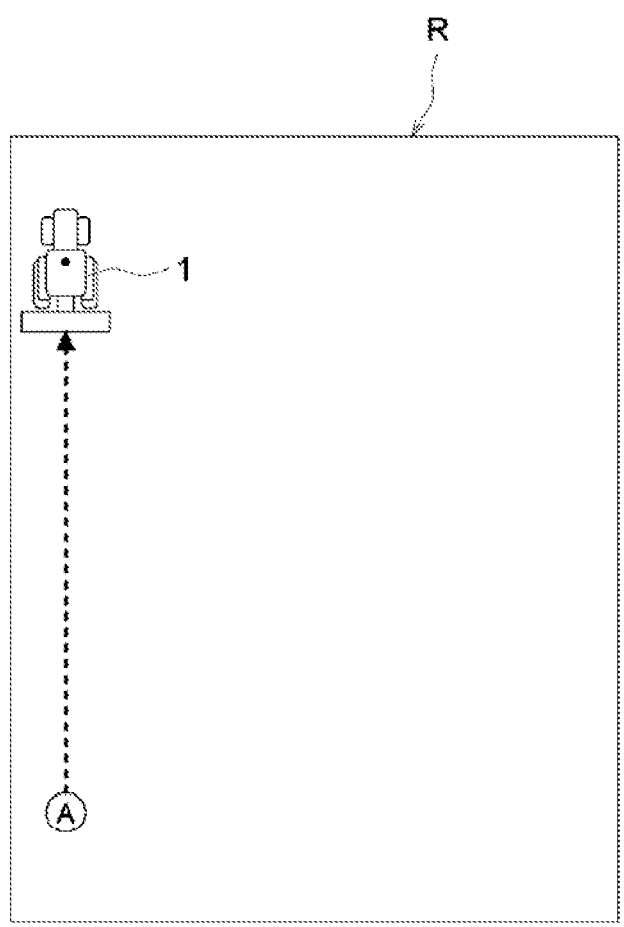
FIG. 3 is a diagram illustrating a work area when generating a target travel path.
Figure 4:
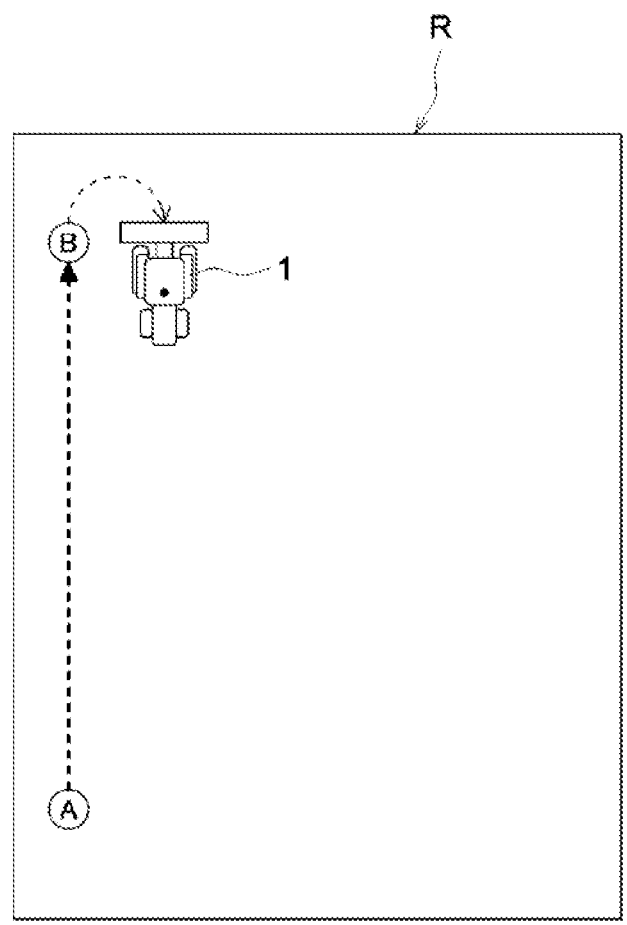
FIG. 4 is a diagram illustrating the work area when generating the target travel path.
Figure 5:
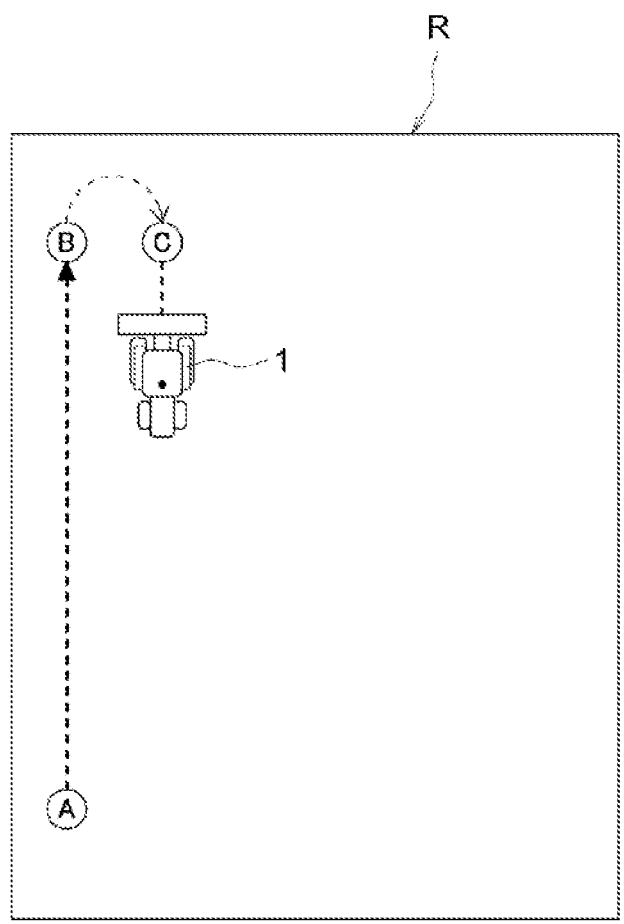
FIG. 5 is a diagram illustrating the work area when generating the target travel path.

As illustrated in FIG. 3 to FIG. 5, in the work area R, the tractor 1 is caused to travel by a manual operation performed by the user or the like, and thus, each of a point A (corresponding to a first reference point), a point B (corresponding to a second reference point), and a point C (corresponding to a third reference point) is registered. As illustrated in FIG. 2, in order to register the point A to the point C, the automatic traveling system includes a reference point setting section 56 that sets the point A to the point C, a manually operating-type reference point setting operation section 57, and a behavior state detection section 27 that detects a behavior state of the tractor 1. The reference point setting section 56 and the reference point setting operation section 57 are provided in the mobile communication terminal 3, and the behavior state detection section 27 is provided in the tractor 1.

First, as illustrated in FIG. 3 and FIG. 4, the tractor 1 is caused to travel from the point A to the point B while a work is performed by the work device 12. At this time, the reference point setting section 56 sets the start point of the work as the point A and the end point of the work as the point B, based on the operation of the reference point setting operation section 57. Although not illustrated, the reference point setting operation section 57 includes an operation section for the point A, an operation section for the point B, and an operation section for the point C, the operation sections being displayed on, for example, the display section 51 of the mobile communication terminal 3. In a case where automatic driving is performed, since the mobile communication terminal 3 is installed in the terminal holding unit or the like arranged near the driver's seat 39, an operation tool including the reference point setting operation section 57 in the tractor 1 (work vehicle) is used.

The reference point setting operation section 57 is not limited to the one displayed on the display section 51 of the mobile communication terminal 3, and various operation units can be applied. For example, the reference point setting operation section 57 may be displayed on a display section of the tractor 1, or may be an operation switch or an operation button arranged in vicinity of the driver's seat 39 of the tractor 1. As will be described later, the remote controller 200 illustrated in FIG. 13 can be used as the reference point setting operation section 57, and the user or the like on board the tractor 1 can carry the reference point setting operation section 57 (remote controller 200).

While the tractor 1 is located at a start point of a work, when the user or the like operates the operation section for the point A of the reference point setting operation section 57, the reference point setting section 56 acquires position information (position information of the tractor 1) of the position information of the positioning unit 21 at the time of the operation and sets the point A (point determined by a latitude and a longitude) in the work area R. When the tractor 1 reaches an end point of the work and the user or the like operates the operation section for the point B of the reference point setting operation section 57, the reference point setting section 56 sets the point B (point determined by the latitude and the longitude) in the work are R, based on position information (position information of the tractor 1) of the positioning unit 21 at the time of the operation.

Next, as illustrated in FIG. 4 and FIG. 5, the tractor 1 is caused to turn from the point B to the point C without performing the work by the work device 12, and the work by the work device 12 is started at the point C. Also at this time, the reference point setting section 56 sets a next work start point as the point C, based on the operation of the reference point setting operation section 57. When the tractor 1 reaches the next work start point and the user or the like operates the operation section for the point C of the reference point setting operation section 57, the reference point setting section 56 sets the point C (point determined by the latitude and the longitude) in the work area R, based on position information (position information of the tractor 1) of the positioning unit 21 at the time of the operation.

As described above, the reference point setting section 56 acquires the position information of the tractor 1 by the positioning unit 21 in accordance with an operation timing of the reference point setting operation section 57 and sets each of the point A, the point B, and point C in the work area R. The reference point setting section 56 causes the in-vehicle storage section 185 to store set information of the point A to the point C.

Even without performing an operation of the reference point setting operation section 57, the reference point setting section 56 can acquire the position information of the tractor 1 by the positioning unit 21, based on detection information of the behavior state detection section 27, and automatically set each of the point A, the point B, and the point C in the work area R.

In a case where the tractor 1 starts a work by the work device 12, the lift drive mechanism 17 moves the work device 12 up and down to a work height and the clutch operation mechanism 16 turns on the work clutch. In a case where the tractor 1 terminates the work by the work device 12, the lift drive mechanism 17 moves the work device 12 up and down to a non-working height different from the working height and the clutch operation mechanism 16 turns off the work clutch. Thus, by detecting a change in operation states of the clutch operation mechanism 16 and the lift drive mechanism 17, a work start point at which the tractor 1 started the work by the work device 12 and a work end point at which the tractor 1 terminated the work by the work device 12 can be known.

The behavior state detection section 27 detects various behaviors in the tractor 1, such as the operation states of the clutch operation mechanism 16, the lift drive mechanism 17, or the like. The reference point setting section 56 monitors a change in behavior, based on the detection information of the behavior state detection section 27, a work start point is specified by the existence of the change in behavior corresponding to a start of a work (changes in the operation states of the clutch operation mechanism 16 and the lift drive mechanism 17), and a work end point is specified by the existence of a change in behavior corresponding to an end of the work.

First, when the reference point setting section 56 specifies a work start point based on the detection information of the behavior state detection section 27, the reference point setting section 56 sets the point A in the work area R, based on position information (position information of the tractor 1) of the positioning unit 21 at the specified point. Next, when the reference point setting section 56 specifies a work end point, based on the detection information of the behavior state detection section 27, the reference point setting section 56 sets the point B in the work area R, based on position information of the positioning unit 21 at the specified point. Next, when the reference point setting section 56 specifies a work start point, based on the detection information of the behavior state detection section 27, the reference point setting section 56 sets the point C in the work area R, based on position information of the positioning unit 21 at the specified point.

As described above, when the reference point setting section 56 sets the point A to the point C in the work area R, based on the operation of the reference point setting operation section 57 or the detection information of the behavior state detection section 27, the travel path generation section 54 generates the target travel path P, based on the point A to the point C.

When the travel path generation section 54 generates the target travel path P, a work area information acquisition section 58 (see FIG. 2) acquires work area information regarding the work area R to which the point A to the point C belong. The work area information includes, for example, identification information that specifies the work area R, position information of the work area R, and shape information of the work area R. An external management device (database) manages the work area information in each of the plurality of work areas R. For example, the management device acquires work area information from map information or the like stored in a database or the like, acquires work area information from measurement information or the like when the shape of the work area is measured, and acquires work area information in each of the plurality of work areas R using various other methods, thereby performing management.

The work area information acquisition section 58 communicates the position information in each of the point A to the point C to the management device via a communication device or the like, and the management device specifies the work area R that belongs to the point A to the point C among the plurality of work areas R, based on the position information in each of the point A to the point C. The management device communicates the work area information related to the specified work area R to the work area information acquisition section 58 via a communication device or the like. In the manner described above, the work area information acquisition section 58 acquires the work area information related to the work area R to which the point A to the point C belong.

Incidentally, in a case where there is no work area R to which the position information in each of the point A to the point C communicated by the work area information acquisition section 58 belongs, the management device communicates a registration error of the point A to the point C to the work area information acquisition section 58. Thus, the work area information acquisition section 58 causes the display section 51 or the like to display the registration error of the point A to the point C to notify the user or the like of the registration error. In a case of this registration error, the point A to the point C will be registered again.

Figure 6:
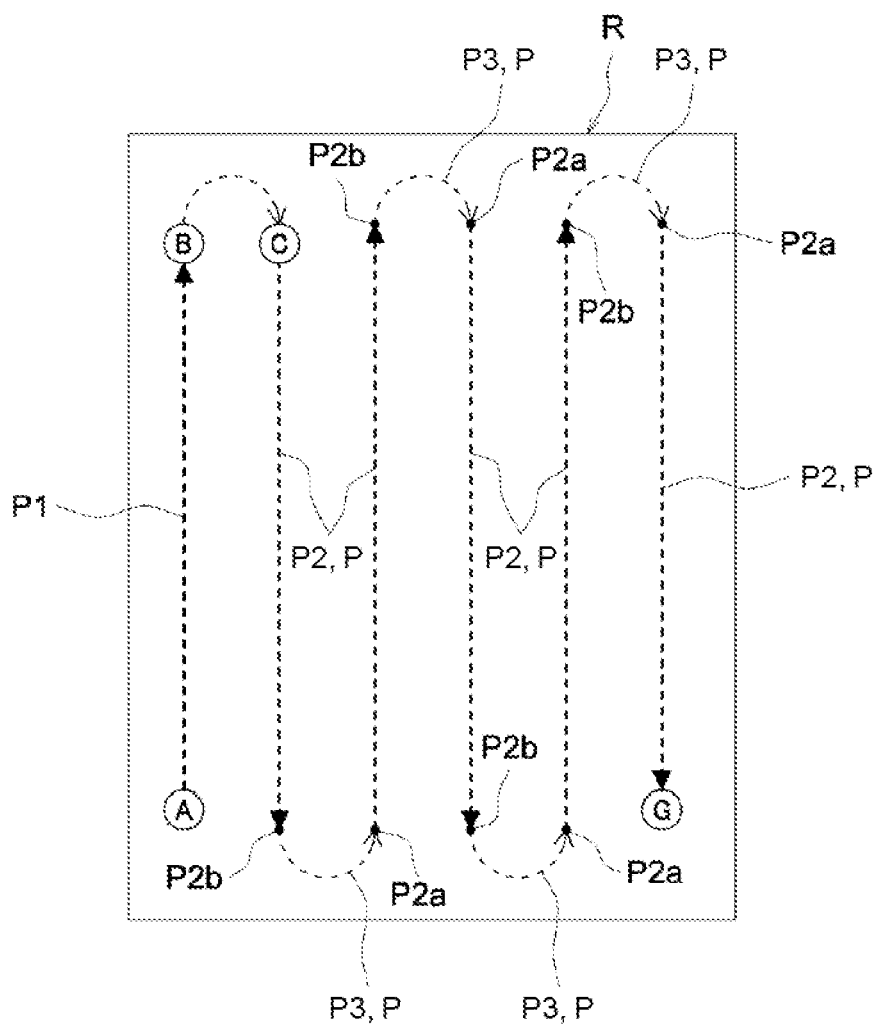
FIG. 6 is a diagram illustrating the work area in a state where the target travel path has been generated.

As illustrated in FIG. 6, the travel path generation section 54 generates, as the target travel path P, a path including a plurality of parallel paths P2 parallel to a first reference line P1 based on the point A and the point B in the work area R specified by the work area information acquired by the work area information acquisition section 58 and sets intervals between the first reference line P1 and one of the parallel paths P2 and between the parallel paths P2, based on a distance between the point B and the point C. The travel path generation section 54 generates a straight line connecting the point A and the point B as the first reference line P1. The first reference line P1 can be stored in the in-vehicle storage section 185 as the first reference path on which the tractor 1 is caused to automatically travel. The travel path generation section 54 provides a plurality of paths having a same length as or substantially a same length as that of the first reference line P1 in parallel with intervals each corresponding to the distance between the point B and the point C therebetween in a direction along a straight line connecting the point B and the point C, and thus, generates the plurality of parallel paths P2 that extend to a goal point G in a state where the parallel paths cover the entire work area R. The plurality of parallel paths P2 are paths on which a predetermined work is performed while the tractor 1 is caused to automatically travel.

As illustrated in FIG. 6, the travel path generation section 54 generates connecting paths P3 in addition to the parallel paths P2. The travel path generation section 54 generates the plurality of connecting paths P3 that connect adjacent ones of the parallel paths P2 to each other. The connecting paths P3 are paths on which a work is not performed and a traveling direction of the tractor 1 is changed.

As described above, the travel path generation section 54 generates the plurality of parallel paths P2 and the plurality of connecting paths P3, and thus, can generate the target travel path P on which the tractor 1 performs a predetermined work while traveling back and forth on the plurality of parallel paths P2. Therefore, even when the user or the like does not perform the input work of inputting various types of information, such as the type, the width, or the like of the work device 12, the target travel path P can be generated only by registering the point A to the point C. Moreover, each of the point A to the point C can be set to a point corresponding to an actual work by a manual operation by the user or the like, and a desired target travel path P can be generated such that the path length of each of the parallel paths P2, the intervals between the adjacent ones of the parallel paths P2, or the like are as intended by the user or the like.

When the travel path generation section 54 generates the target travel path P, the terminal electronic control unit 52 transfers path information from the mobile communication terminal 3 to the tractor 1, so that the in-vehicle electronic control unit 18 of the tractor 1 acquires the path information. Thus, the in-vehicle electronic control unit 18 can cause the tractor 1 to automatically travel along the target travel path P while acquiring its own current position (current position of the tractor 1) by the positioning unit 21, based on the acquired path information. The current position of the tractor 1 acquired by the positioning unit 21 is transmitted from the tractor 1 to the mobile communication terminal 3 in real time (for example, in a cycle of several milliseconds), and the current position of the tractor 1 is known by the mobile communication terminal 3. For example, during automatic traveling of the tractor 1, a deviation (deviation in a lateral direction) between the current position of the tractor 1 and the target travel path P in a direction orthogonal to the traveling direction on the target travel path P is displayed on the display section 51 of the mobile communication terminal 3 or the display section of the tractor 1. Therefore, during automatic traveling of the tractor 1, the user or the like can grasp how much the position of the tractor 1 is shifted with respect to the target travel path P.

Figure 7:
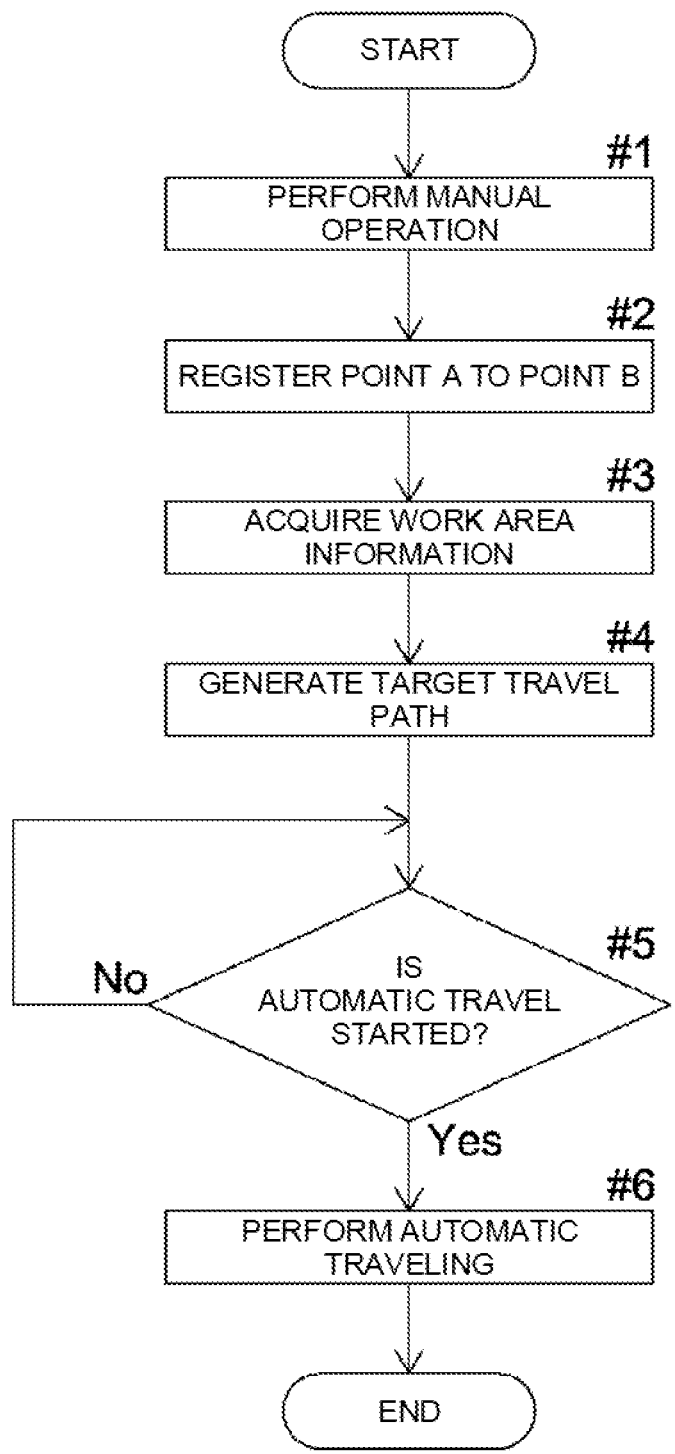
FIG. 7 is a flowchart illustrating a flow of an operation in a case where automatic traveling is performed.

A flow of an operation in a case where automatic traveling is performed will be described with reference to a flowchart of FIG. 7. First, as illustrated in FIG. 3 to FIG. 5, the tractor 1 is caused to travel in the work area R by a manual operation by the user or the like to actually perform a work, and registration (setting) of the point A to the point C by the reference point setting section 56 is performed (Step #1, Step #2). The work area information acquisition section 58 acquires the work area information of the work area R to which the point A to the point C belong, based on registration information (position information) of the point A to the point C, and the travel path generation section 54 generates the target travel path P including the plurality of parallel paths P2 and the plurality of connecting paths P3, as illustrated in FIG. 6 (Step #3 and Step #4).

When various automatic traveling start conditions are satisfied and the user operates the display section 51 via the mobile communication terminal 3 to instruct a start of automatic traveling, the in-vehicle electronic control unit 18 performs automatic travel control in which the tractor 1 is caused to automatically travel along the target travel path P in the work area R, based on the position information of the tractor 1 acquired by the positioning unit 21 using the satellite navigation system, as illustrated in FIG. 6 (in a case of YES in Step #5, Step #6).

In automatic travel control, the in-vehicle electronic control unit 18 causes the tractor 1 to linearly travel in an automatic manner along each of the plurality of parallel paths P2 such that a work by the work device 12 is started at each start position P2*a* of the plurality of parallel paths P2 and the work by the work device 12 is terminated at each end position P2*b* of the plurality of parallel paths P2. Regarding the connecting paths P3, the in-vehicle electronic control unit 18 causes the tractor 1 to automatically turn along each of the plurality of connecting paths P3 such that a work by the work device 12 is not performed. The in-vehicle electronic control unit 18 causes the tractor 1 to automatically travel continuously from the parallel path P2 to the connecting path P3 and then automatically travel continuously from the connecting path P3 to the parallel path P2 to reach the goal point G.

As described above, the in-vehicle electronic control unit 18 causes the tractor 1 to automatically travel also on the connecting path P3, but the tractor 1 may be caused to travel by a manual operation by the user or the like on the connecting paths P3. In this case, when an automatic operation is switched to a manual operation at the end position P2*b* of the parallel path P2, various automatic traveling start conditions, such as a condition in which the orientation of the tractor 1 in the traveling direction and an orientation of an extension direction of the parallel path P2 are in a predetermined range, or the like, are satisfied, and a start of automatic traveling is instructed, the manual operation is switched to an automatic operation and the tractor 1 is caused to automatically travel along the next parallel path P2. In a case where a manual operation is performed, the current position of the tractor 1 and the parallel path P are superimposed and displayed on the display section 51 of the mobile communication terminal 3 or the display section of the tractor 1, and thus, the tractor 1 that is to be manually operated can be guided toward the parallel path P2. As described above, in a case where the tractor 1 is manually operated on the connecting paths P3, the travel path generation section 54 can generate only the parallel paths P2 without generating the connecting paths P3.

When the work in the work area R is completed and a setting information erasing condition is satisfied, the in-vehicle electronic control unit 18 erases setting information of the point A to the point C stored in the in-vehicle storage section 185. Thus, the point A to the point C in the next work area R can be registered. Various conditions, such as, for example, a condition in which the tractor 1 has moved out of the work area R, a condition in which a set time has elapsed since an end of automatic traveling, or the like, can be set as the setting information erasing condition.

During automatic traveling, in order to prevent the tractor 1 from jumping out of the work area R, the user or the like is notified of an approach state where the tractor 1 has come close to an end of the work area R or the like. As illustrated in FIG. 2, the automatic traveling system includes a notification position specification section 59 that specifies a notification position where end notification of notifying of the approach state with respect to an end of the work area R, based on the point A, the point B, and the work area information acquired by the work area information acquisition section 58, and an end notification control section 186 that, in a case where the tractor 1 automatically travels, when the current position of the tractor 1 reaches the notification position, performs end notification.

The notification position specification section 59 is provided in the mobile communication terminal 3 and, as illustrated in FIG. 6, specifies the end position P2*b* in each of the plurality of parallel paths P2 as the notification position, based on the position information of the point A and the point B. For example, the notification position specification section 59 can specify the same positions as the point A and the point B as the notification positions on the parallel paths P2. The notification position specification section 59 can also specify, in addition to or instead of the end position P2b, a position located close to an end of the work area R, that is, a position located at a set distance from the end of the work area R, as the notification position, based on the work area information (specifically, position information of the end of the work area R). The notification position specification section 59 can specify the end position P2b of the parallel path P2 and the position located close to the end of the work area R, that is, the position located at the set distance from the end of the work area R, as the notification positions, and the user or the like can select specifying one of the positions as the notification position or specifying both the positions as the notification positions.

As described above, since the notification position specification section 59 specifies the notification position, in automatic travel control in which the tractor 1 is caused to automatically travel, when it is determined based on the positioning information of the tractor 1 acquired by the positioning unit 21 using the satellite navigation system that the current position of the tractor 1 has reached the notification position (for example, the end position P2b), the end notification control section 186 operates the notification device 26 and performs end notification to notify the user or the like of the approach state where the tractor 1 has come close to the end of the work area R. In end notification, for example, various notifications, such as a voice, lighting of an alarm lamp, an operation of an alarm buzzer, or the like indicating that the tractor 1 is in the approach state, can be performed by the notification device 26. In the end notification, not only the notification device 26 of the tractor 1 is operated, but also the approach state can be notified in the mobile communication terminal 3 by causing the display section 51 of the mobile communication terminal 3 to display that the tractor 1 is in the approach state.

As the end notification control section 186 performs end notification, the in-vehicle electronic control unit 18 can also stop traveling of the tractor 1. As described above, by stopping traveling of the tractor 1, it is possible to appropriately prevent the tractor 1 from jumping out of the work area R.

Figure 8:
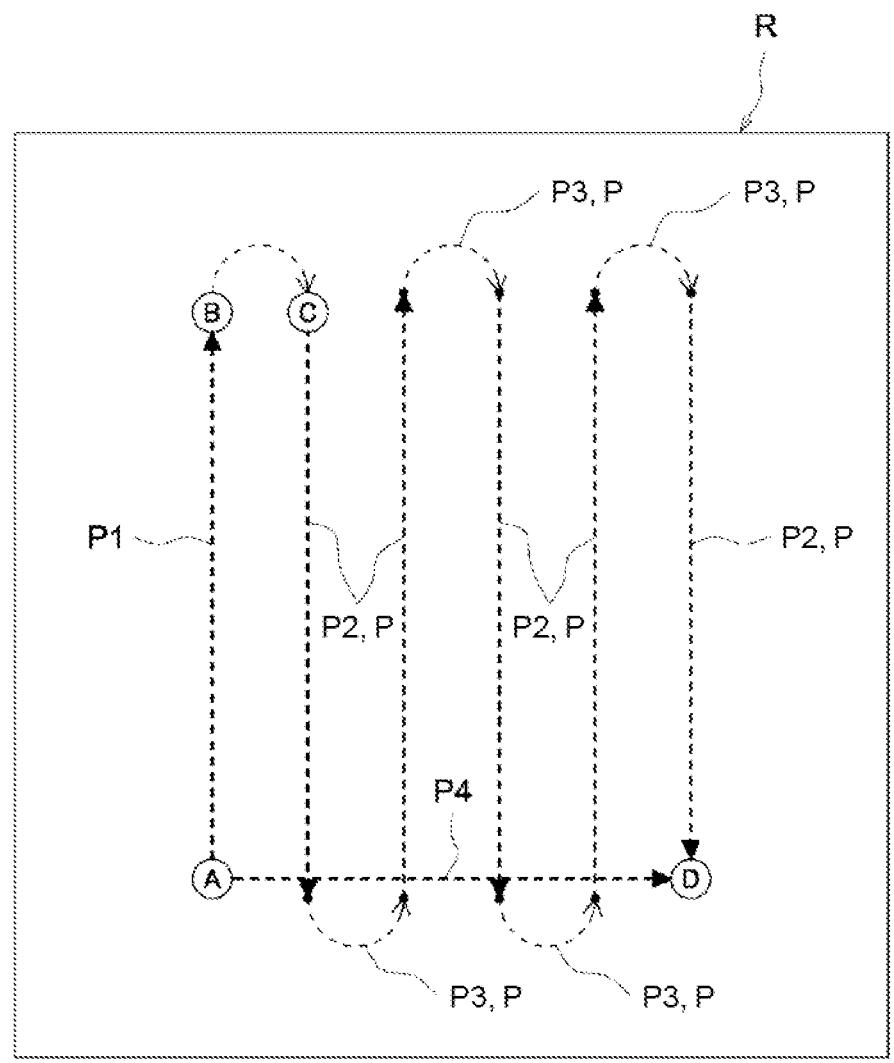
FIG. 8 is a diagram illustrating a work area when generating an additional path.

As illustrated in FIG. 8, the reference point setting section 56 is configured to set a point D (corresponding to a fourth reference point) in addition to the point A to the point C. The point D is used for generating a second reference line P4 different from the first reference line P1 and, similar to the point A to the point C, the reference point setting section 56 sets the point D in the work area R by acquiring the positional information of the tractor 1 by the positioning unit 21, based on an operation of the reference point setting operation section 57 or the detection information of the behavior state detection section 27, and using the acquired position information as position information of the point D.

In a case where the point D is set based on the detection information of the behavior state detection section 27, the traveling direction of the tractor 1 is changed to a direction different from the parallel path P2 or automatic traveling of the tractor 1 is terminated to stop traveling of the tractor 1 by terminating the automatic traveling at the point D, and therefore, based on the detection information of the behavior state detection section 27, an automatic traveling end point can be specified by specifying that the traveling direction of the tractor 1 has been changed to a direction different from the parallel path P2 or that automatic traveling of the tractor 1 is terminated to stop traveling of the tractor 1.

When the reference point setting section 56 sets the point D, the travel path generation section 54 generates a second reference line P4 connecting the point D to the point A or the point B. One of a straight line connecting the point D and the point A and a straight line connecting the point D and the point B whose angle at which the straight line intersecting the first reference line P1 is closer to 90 degrees is defined as the second reference line P4. In an example illustrated in FIG. 8, for example, the straight line connecting the point D and the point A is orthogonal to the first reference line P1, and thus, the second reference line P4 connecting the point D and the point A is generated. The second reference line P4 may be any straight line connecting the point D to the point A or the point B, is not limited to the straight line orthogonal to the first reference line P1, and may be obliquely intersects the first reference line P1.

Figure 9:
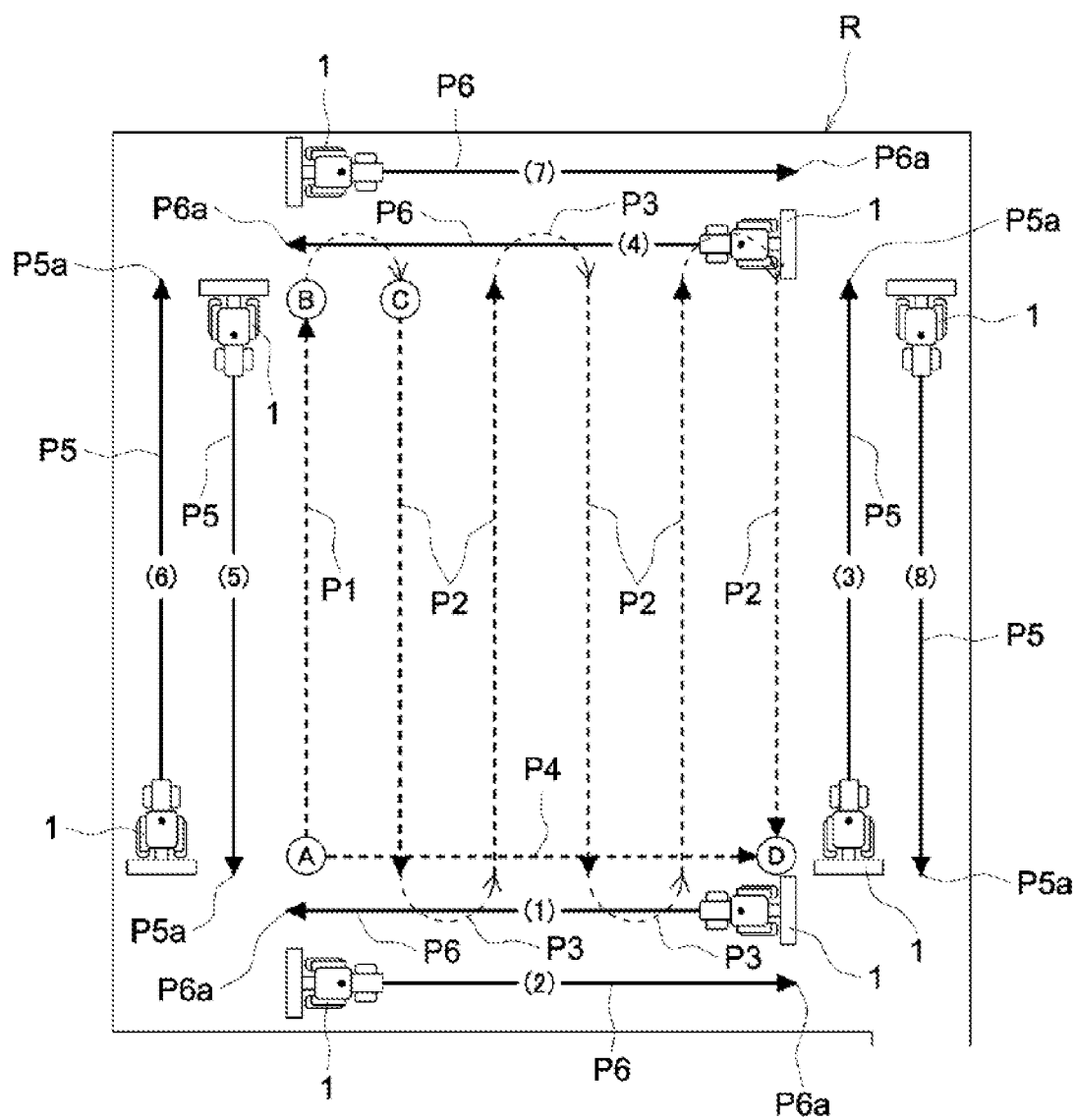
FIG. 9 is a diagram illustrating a work area in a state where additional paths have been generated.

As illustrated in FIG. 9, the travel path generation section 54 selects one of the first reference line P1 and the second reference line P4 when a predetermined condition is satisfied and generates, as a target travel path P, a path including, in addition to the first reference line P1, the plurality of parallel paths P2, and the plurality of connecting paths P3, additional paths P5 and P6 extending parallel to the selected one of the reference lines P1 and P4, based on the current position of the tractor 1. For example, the additional paths P5 and P6 can be generated to cause the tractor 1 to automatically travel in a peripheral area around a central area of the work area R where the first reference line P1 and the plurality of parallel paths P2 are generated.

In an example illustrated in FIG. 9, for the additional paths P5 and P6, a work order of (1) to (8) is illustrated, and description will be added according to the work order.

(1) After reaching the point D, when the tractor 1 is manually operated and moves downward in FIG. 9 and the orientation of the tractor 1 in the traveling direction and an orientation in an extension direction of the second reference line P4 are in a predetermined range, a predetermined condition is satisfied. Thus, the travel path generation section 54 selects the second reference line P4 and generates an additional path P6 of the work order (1) parallel to the second reference line P4, and the in-vehicle electronic control unit 18 causes the tractor 1 to automatically travel along the additional path P6 of the work order (1).

Description will be hereinafter given on how to generate the additional path P6. Incidentally, the additional paths P5 and P6 are generated in similar manners, and therefore, description thereof will be omitted in (2) to (8). The travel path generation section 54 sets a start position of the additional path P6 using, as a reference, the position of the tractor 1 when the predetermined condition is satisfied and generates the additional path P6 such that an end position P6a of the additional path P6 is the same or substantially the same as an end position (point A or point D) of the second reference line P4 that has been selected and is parallel to the additional path P6.

For example, in FIG. 9, when the tractor 1 is moving to the same position as the point D in a left-right direction, the orientation of the tractor 1 in the traveling direction and the orientation in the extension direction of the second reference line P4 are in the predetermined range. Thus, the start position of the additional path P6 is set using the position of the tractor 1 then as a reference, and the end position P6a of the additional path P6 is set as the end position (point A) of the second reference line P4 on an opposite side to a side where the tractor 1 is located (point A). Accordingly, the additional path P6 having the same length as that of the second reference line P4 is generated.

In contrast, in FIG. 9, while the tractor 1 is moving in a further right side of the point D, when the orientation of the tractor 1 in the traveling direction and the orientation in the extension direction of the second reference line P4 are in the predetermined range, the start position of the additional path P6 is set using the position of the tractor 1 then as a reference. Accordingly, the additional path P6 having a length longer than that of the second reference line P4 is generated. On the other hand, in FIG. 9, while the tractor 1 is moving in a further left side of the point D, when the orientation of the tractor 1 in the traveling direction and the orientation in the extension direction of the second reference line P4 are in the predetermined range, the start position of the additional path P6 is set using the position of the tractor 1 then as a reference, and therefore, the additional path P6 having a length shorter than that of the second reference line P4 is generated.

(2) After the automatic traveling on the additional path P6 in the work order (1) is completed, when the tractor 1 is manually operated and moves downward in FIG. 9 and the orientation of the tractor 1 in the traveling direction and the orientation in the extension direction of the second reference line P4 are in the predetermined range, the predetermined condition is satisfied. Thus, the travel path generation section 54 selects the second reference line P4 and generates the additional path P6 of the work order (2) parallel to the second reference line P4, and the in-vehicle electronic control unit 18 causes the tractor 1 to automatically travel along the additional path P6 of the work order (2).

(3) After the automatic traveling on the additional path P6 in the work order (2) is completed, when the tractor 1 is manually operated and moves upward in FIG. 9 and the orientation of the tractor 1 in the traveling direction and the orientation in the extension direction of the first reference line P1 are in a predetermined range, a predetermined condition is satisfied. Thus, the travel path generation section 54 selects the first reference line P1 and generates the additional path P5 in the work order (3) parallel to the first reference line P1. Therefore, the in-vehicle electronic control unit 18 causes the tractor 1 to automatically travel along the additional path P5 of the work order (3).

Regarding (4) to (8), except that the selected reference line is different, similar operations to those in (2) and (3) or the like are performed, and therefore, description thereof will be omitted.

Figure 10:
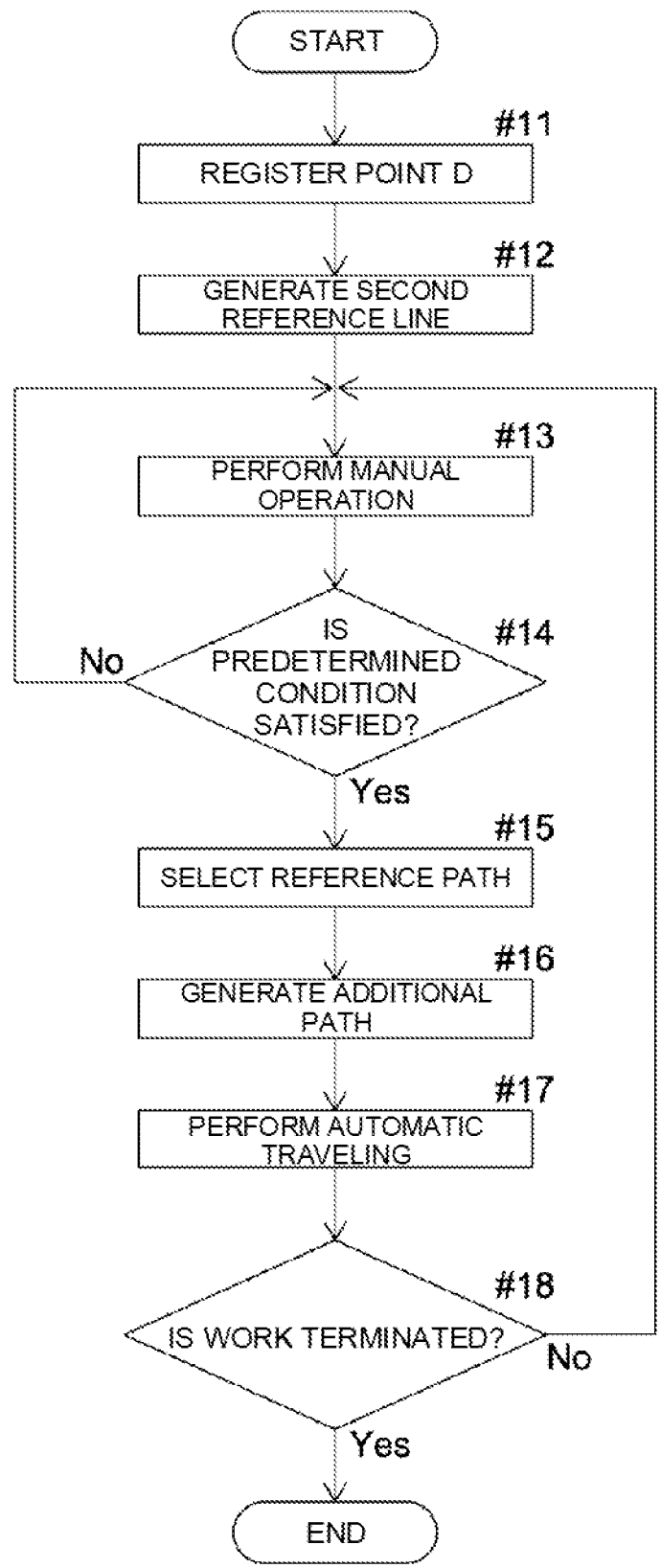
FIG. 10 is a flowchart illustrating a flow of an operation in a case where automatic traveling is performed.

A flow of an operation in a case where automatic traveling is performed on the additional paths P5 and P6 illustrated in FIG. 9 will be described with reference to a flowchart of FIG. 10. Incidentally, as illustrated in the flowchart of FIG. 7, the automatic traveling on the additional paths P5 and P6 is performed following the automatic traveling to the point D on the plurality of parallel paths P2 and the plurality of connecting paths P3.

As illustrated in FIG. 9, when the tractor 1 reaches the point D and the work by the work device 12 is completed, the reference point setting section 56 performs registration (setting) of the point D (Step #11). The travel path generation section 54 generates the second reference line P4, based on registration information (position information) of the point D (Step #12).

After reaching the point D, the tractor 1 is manually operated by a manual operation by the user or the like and, during this manual operation, the travel path generation section 54 determines whether the predetermined condition is satisfied (Step #13, Step #14). The predetermined condition is set to be a condition in which the orientation of the tractor 1 in the traveling direction and the orientation in the extension direction of the reference line (the orientation in the extension direction of the first reference line P1 or the orientation in the extension direction of the second reference line P4) are in a predetermined range. Incidentally, the orientation of the tractor 1 in the traveling direction can be acquired from the measurement information of the positioning unit 21, and the orientation in the extension direction of the reference line can be acquired from the position information of the first reference line P1 and the second reference line P4.

When the predetermined condition is satisfied, the travel path generation section 54 selects one of the first reference line P1 and the second reference line P4 in accordance with which one of the first reference line P1 or the second reference line P4 the predetermined condition is satisfied (Step #15). The travel path generation section 54 generates the additional paths P5 and P6 parallel to the reference line selected based on the current position of the tractor 1 (Step #16). Incidentally, in a case where the predetermined condition is satisfied for both the first reference line P1 and the second reference line P4, one of the reference lines which has a smaller deviation between the orientation of the tractor 1 in the traveling direction and the orientation in the extension direction of the reference line is selected.

When the travel path generation section 54 generates the additional paths P5 and P6, the terminal electronic control unit 52 transfers path information related to the additional paths P5 and P6 from the mobile communication terminal 3 to the tractor 1, and thus, the in-vehicle electronic control unit 18 acquires the path information. Thus, when various automatic traveling start conditions are satisfied and the user operates the display section 51 to instruct a start of automatic traveling in the mobile communication terminal 3, the in-vehicle electronic control unit 18 performs automatic travel control for causing the tractor 1 to automatically travel along the additional paths P5 and P6 while acquiring the current position (current position of the tractor 1) of itself by the positioning unit 21, based on the acquired path information (Step #17).

In the automatic travel control then, the tractor 1 is caused to linearly travel in an automatic manner along the additional paths P5 and P6 such that the in-vehicle electronic control unit 18 starts the work by the work device 12 and terminates the work by the work device 12 at the end positions P5a and P6a of the additional paths P5 and P6. Because the tractor 1 is manually operated when the work by the work device 12 is started, the work by the work device 12 can be also started by a manual operation by the user or the like.

As described above, the tractor 1 is manually operated until the predetermined condition is satisfied and, when the predetermined condition is satisfied and the additional paths P5 and P6 are generated, the tractor 1 is caused to automatically travel along the additional paths P5 and P6 (Step #13 to Step #17), and the above-described operations are repeated until the work in the work area R is completed (in a case where No is determined in step #18). When an operation end condition, such as a condition in which the tractor 1 moves out of the work area R, or the like, is satisfied, the in-vehicle electronic control unit 18 determines that the work in the work area R is completed.

Even in a case where the tractor 1 automatically travels on the additional paths P5 and P6, similar to the above-described case, in order to prevent the tractor 1 from jumping out of the work area R, the user or the like is notified of the approach state where the tractor 1 has come close to an end of the work area R or the like. As illustrated in FIG. 9, the notification position specification section 59 specifies the end positions P5a and P6a on the additional paths P5 and P6 as the notification positions, based on the position information of the additional paths P5 and P6. For example, in a case where the additional path P5 is generated, the notification position specification section 59 specifies the end position P5a that is the same position as the point A or the point B as the notification position on the additional path P5 and, in a case where the additional path P6 is generated, the notification position specification section 59 specifies the end position P6a that is the same position as the point A or the point D as the notification position on the additional path P6. The notification position specification section 59 can also specify a position close to an end of the work area R, that is, a position located at the set distance from the end of the work area R, as the notification position, based on work area information (specifically, the position information of the end of the work area R) in addition to or instead of the end positions P5a and P6a on the additional paths P5 and P6.

Because the notification position specification section 59 specifies the notification position, in automatic travel control in which the tractor 1 is caused to automatically travel along the additional paths P5 and P6, when the end notification control section 186 determines that the current position of the tractor 1 has reached the notification position (for example, the end positions P5a and P6a), the end notification control section 186 operates the notification device 26 to perform end notification and notifies the user or the like of the approach state where the tractor 1 has come close to an end of the work area R or the like. In a case where the end positions P5a and P6a on the additional paths P5 and P6 are set as the notification positions, the user or the like can recognize that the automatic traveling on the additional paths P5 and P6 is terminated by the operation of the notification device 26, and therefore, it is possible to smoothly switch from automatic traveling to manual traveling. Further, in a case where the position located close to an end of the work area R, that is, the position located at the set distance from the end of the work area R, is set as the notification position, the in-vehicle electronic control unit 18 can also continuously cause the tractor 1 to automatically travel until the tractor 1 reaches the notification position without terminating automatic traveling of the tractor 1 even when the tractor 1 has reached the end positions P5a and P6a of the additional paths P5 and P6.

As illustrated in FIG. 9, not only it is enabled by registering the point A to the point C to perform the work on the central area of the work area R by automatic traveling of the tractor 1, but also it is enabled by registering the point D to perform the work on the peripheral area around the central area by the automatic traveling of the tractor 1, so that the work of the work area R can be efficiently performed. In FIG. 9, for four corner areas of the work area R, for example, the work can be performed by a manual operation of the tractor 1 by a manual operation by the user or the like, following the automatic traveling on the additional paths P5 and P6.

Second Embodiment

A second embodiment illustrates another embodiment of the first embodiment, a different configuration from that of the first embodiment will be mainly described, a similar component to a corresponding component of the first embodiment will be denoted by the same reference numeral as that of the corresponding component in the first embodiment, and therefore, description thereof will be omitted.

Figure 11:
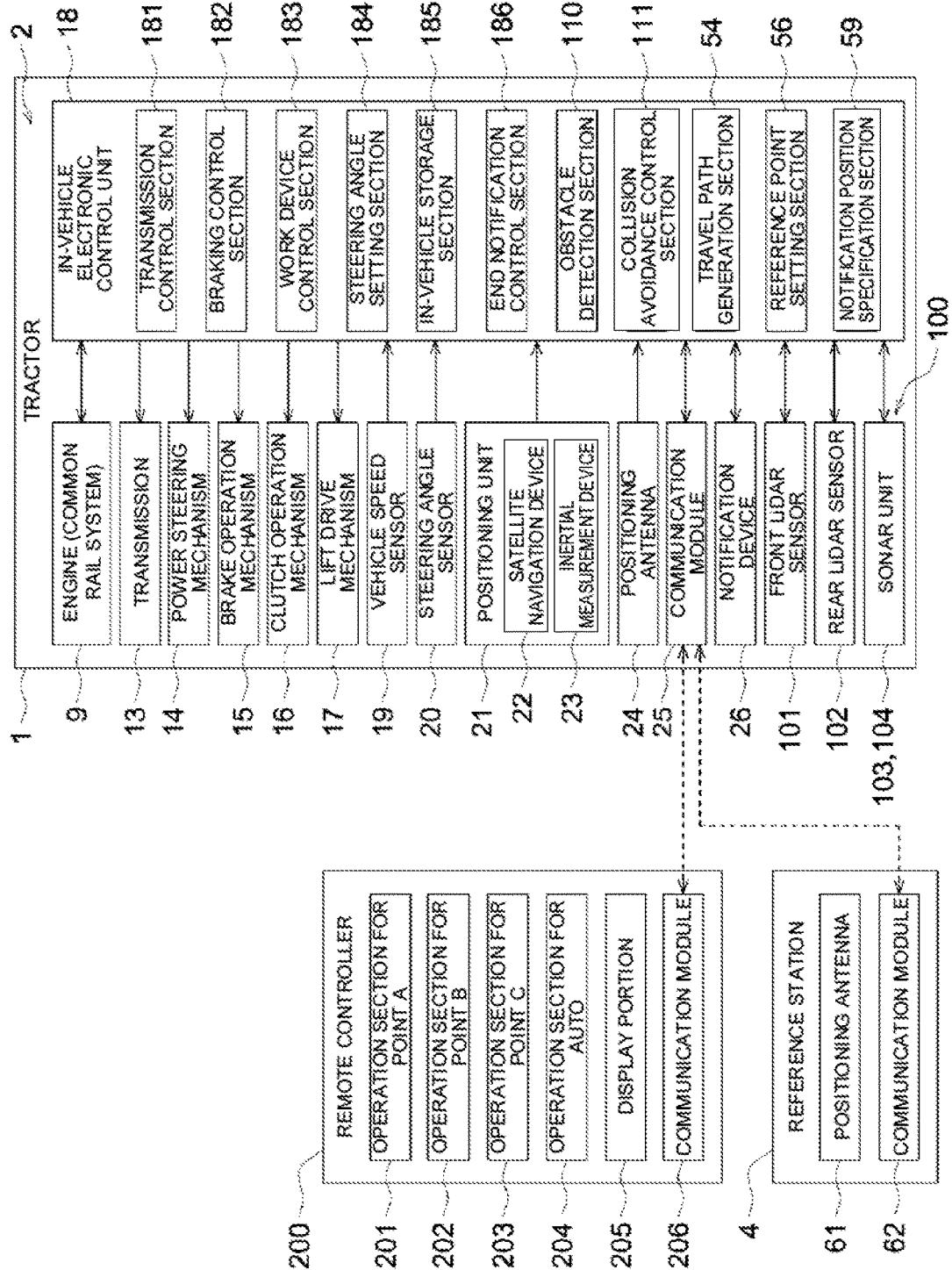
FIG. 11 is a block diagram illustrating a schematic configuration of an automatic traveling system according to a second embodiment.
Figure 13:
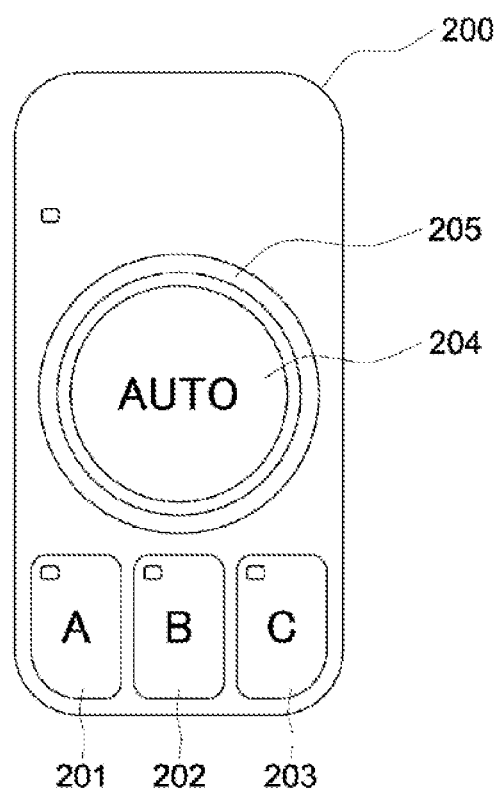
FIG. 13 is a diagram illustrating a remote controller.

In the second embodiment, unlike the first embodiment, the mobile communication terminal 3 is not provided, and as illustrated in FIG. 11, the travel path generation section 54, the reference point setting section 56, the notification position specification section 59, and the like are provided in the in-vehicle electronic control unit 18. As illustrated in FIG. 11 and FIG. 13, a remote controller 200 that can be carried by a user or the like is provided as the reference point setting operation section 57. The remote controller 200 is configured to freely communicate various types of information with the in-vehicle electronic control unit 18 of the tractor 1 via communication modules 25 and 206 and the like. As illustrated in FIG. 13, the remote controller 200 includes an operation section 201 for the point A used for registering the point A, an operation section 202 for the point B used for registering the point B, an operation section 203 for the point C used for registering the point C, and a circular-shaped operation section 204 for AUTO used for instructing the automatic traveling. A ring-shaped display portion 205 having light emitting portions, such as a plurality of LEDs or the like, is provided around the circular-shaped operation section 204 for AUTO, and the display portion 205 is configured to be freely switched to a plurality of display forms by making lighting states of the plurality of light emitting portions different from each other.

A method for generating the target travel path P by the travel path generation section 54 in the second embodiment will be described. Similar to the first embodiment, the travel path generation section 54 generates the target travel path P when the user or the like performs a driving operation to cause the tractor 1 to travel in the work area R and to actually perform the work.

As illustrated in FIG. 3 to FIG. 5, the reference point setting section 56 registers each of the point A, the point B, and the point C, based on an operation of the remote controller 200 (see FIG. 13) by causing the tractor 1 to travel by a manual operation by the user or the like in the work area R. For example, when the operation section 201 for the point A of the remote controller 200 is operated, the reference point setting section 56 acquires the position information (position information of the tractor 1) of the positioning unit 21 at an operation point to set the point A (a point determined by the latitude and the longitude) in the work area R. Similarly, for the point B and the point C, the reference point setting section 56 also sets the point B and the point C (points determined by the latitude and the longitude), based on an operation of the operation section 202 for the point B of the remote controller 200 and an operation of the operation section 203 for the point C of the remote controller 200. Incidentally, similar to the first embodiment, the reference point setting section 56 can acquire the position information of the tractor 1 by the positioning unit 21, based on the detection information of the behavior state detection section 27, and can automatically set each of the point A, the point B, and the point C in the work area R.

When the reference point setting section 56 sets the point A to the point C in the work area R, based on the operation of the remote controller 200 or the detection information of the behavior state detection section 27, the travel path generation section 54 generates the target travel path P, based on the point A to the point C.

Figure 12:
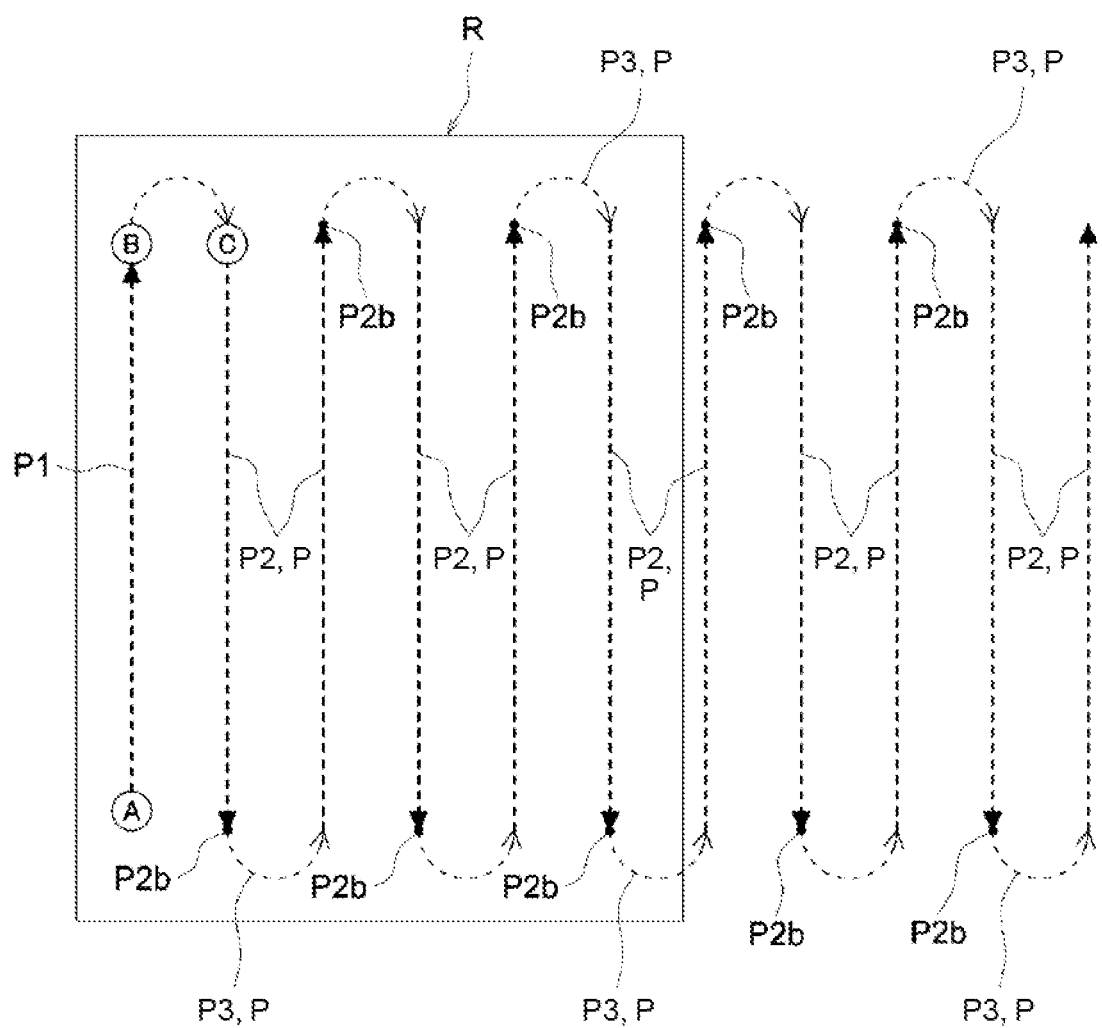
FIG. 12 is a diagram illustrating a work area in a state where a target travel path has been generated in the second embodiment.

In the first embodiment, when the travel path generation section 54 generates the target travel path P, the work area information acquisition section 58 acquires the work area information related to the work area R to which the point A to the point C belong, whereas, in the second embodiment, the work area information acquisition section 58 is not provided and the travel path generation section 54 generates the target travel path P as illustrated in FIG. 12 without acquiring the work area information.

As illustrated in FIG. 12, the travel path generation section 54 generates, as the target travel path P, a path including the plurality of parallel paths P2 parallel to the first reference line P1 based on the point A and the point B and sets intervals between the first reference line P1 and one of the parallel paths P2 and between the parallel paths P2, based on the distance between the point B and the point C. The travel path generation section 54 generates a straight line connecting the point A and the point B as the first reference line P1. The travel path generation section 54 generates a set number of parallel paths P2 by arranging a plurality of paths having the same length or substantially the same length as that of the first reference line P1 with an interval corresponding to the distance between the point B and the point C therebetween in a direction along a straight line connecting the point B and the point C. The parallel paths P2 are paths on which a predetermined work is performed while the tractor 1 is caused to automatically travel.

In the second embodiment, because the work area information is not acquired, the travel path generation section 54 generates the set number of parallel paths P2 (for example, 10 parallel paths in FIG. 12) regardless of the position and the shape of the work area R. Then, the travel path generation section 54 generates the connecting paths P3 in addition to the parallel paths P2. The travel path generation section 54 generates the plurality of connecting paths P3 that connect adjacent ones of the parallel paths P2 to each other. The connecting paths P3 are paths used for changing a traveling direction of the tractor 1 without performing a work.

As described above, the travel path generation section 54 generates the plurality of parallel paths P2 and the plurality of connecting paths P3, so that the target travel path P on which the tractor 1 performs a predetermined work while traveling back and forth on the plurality of parallel paths P2 can be generated. Therefore, even when the user or the like does not perform the input work for various types of information, such as the type, the width, or the like of the work device 12, the target travel path P can be generated only by registering the point A to the point C. Moreover, each of the point A to the point C can be set to be a point corresponding to an actual work by a manual operation by the user or the like, and a desired target travel path P can be generated such that the path length of each of the parallel paths P2, the interval between adjacent ones of the parallel paths P2, or the like are as intended by the user or the like.

In a case where automatic traveling is performed, the operation section 204 for AUTO of the remote controller 200 is operated in a state where various automatic travelling start conditions are satisfied, and thus, the in-vehicle electronic control unit 18 performs automatic travel control in which the tractor 1 is caused to automatically travel along the target travel path P. In the automatic travel control then, the tractor 1 is caused to linearly travel in an automatic manner along each of the plurality of parallel paths P2 such that the in-vehicle electronic control unit 18 starts the work by the work device 12 at the start position P2a of the parallel path P2 and terminates the work by the work device 12 at the end position P2b of the parallel path P2 to stop traveling of the tractor 1. When the operation section 204 for AUTO of the remote controller 200 is operated after traveling of the tractor 1 is stopped at the end position P2b of the parallel path P2, the in-vehicle electronic control unit 18 causes the tractor 1 to automatically turn along each of the plurality of connecting paths P3 without performing the work by the work device 12.

As described above, in automatic travel control, traveling of the tractor 1 is stopped at the end position P2b of the parallel path P2, and therefore, unless the operation section 204 for AUTO of the remote controller 200 is not operated again, automatic traveling on the connecting path P3 is not performed. Therefore, in a case where there is a possibility that the tractor 1 approaches an end of the work area R and jumps out of the work area R, the user or the like does not perform an operation of the operation section 204 for AUTO of the remote controller 200, and thus, it is possible to prevent the tractor 1 from jumping out of the work area R. Thus, as illustrated in FIG. 12, even when the target travel path P is also generated outside the work area R, automatic traveling can be performed without the tractor 1 jumping out of the work area R.

As described above, the in-vehicle electronic control unit 18 causes the tractor 1 to automatically travel also on the connecting path P3, but the tractor 1 may be manually operated on the connecting path P3 by a manual operation by the user or the like. In this case, when an automatic operation is switched to a manual operation at the end position P2b of the parallel path P2, various automatic traveling start conditions, such as a condition in which the orientation of the tractor 1 in the traveling direction and the orientation in the extension direction of the parallel path P2 are in the predetermined range, or the like, are satisfied, and a start of automatic traveling is instructed, the manual operation is switched to an automatic operation and the tractor 1 is caused to automatically travel along the parallel path P2. In a case where a manual operation is performed, the current position of the tractor 1 and the parallel path P are superimposed and displayed on the display section 51 of the mobile communication terminal 3 or the display section of the tractor 1, and thus, the tractor 1 that is to be manually operated can be guided toward the parallel path P2.

Also in the second embodiment, in a case where automatic traveling is performed, similar to the first embodiment, in order to prevent the tractor 1 from jumping out of the work area R, the user or the like is notified of the approach state where the tractor 1 has come close to an end of the work area R or the like. As illustrated in FIG. 12, the notification position specification section 59 specifies the end position P2b on the parallel path P2 as the notification position, based on the position information of the point A and the point B. Since the notification position specification section 59 specifies the notification position, in automatic travel control in which the tractor 1 is caused to automatically travel along the parallel path P2, when the end notification control section 186 determines that the current position of the tractor 1 has reached the notification position (for example, the end position P2b), the notification device 26 is operated to perform end notification and thus notifies the user or the like of the approach state where the tractor 1 has come close to an end of the work area R or the like. In this case, the display portion 205 of the remote controller 200 can also display that the tractor 1 is in the approach state.

Third Embodiment

A third embodiment illustrates a case where the shape of the work area R is different from that in the first embodiment, and the shape of the work area R will be mainly described, and a similar component to a corresponding component of the first embodiment will be denoted by the same reference numeral as that of the corresponding component in the first embodiment, and therefore, description thereof will be omitted.

Figure 14:
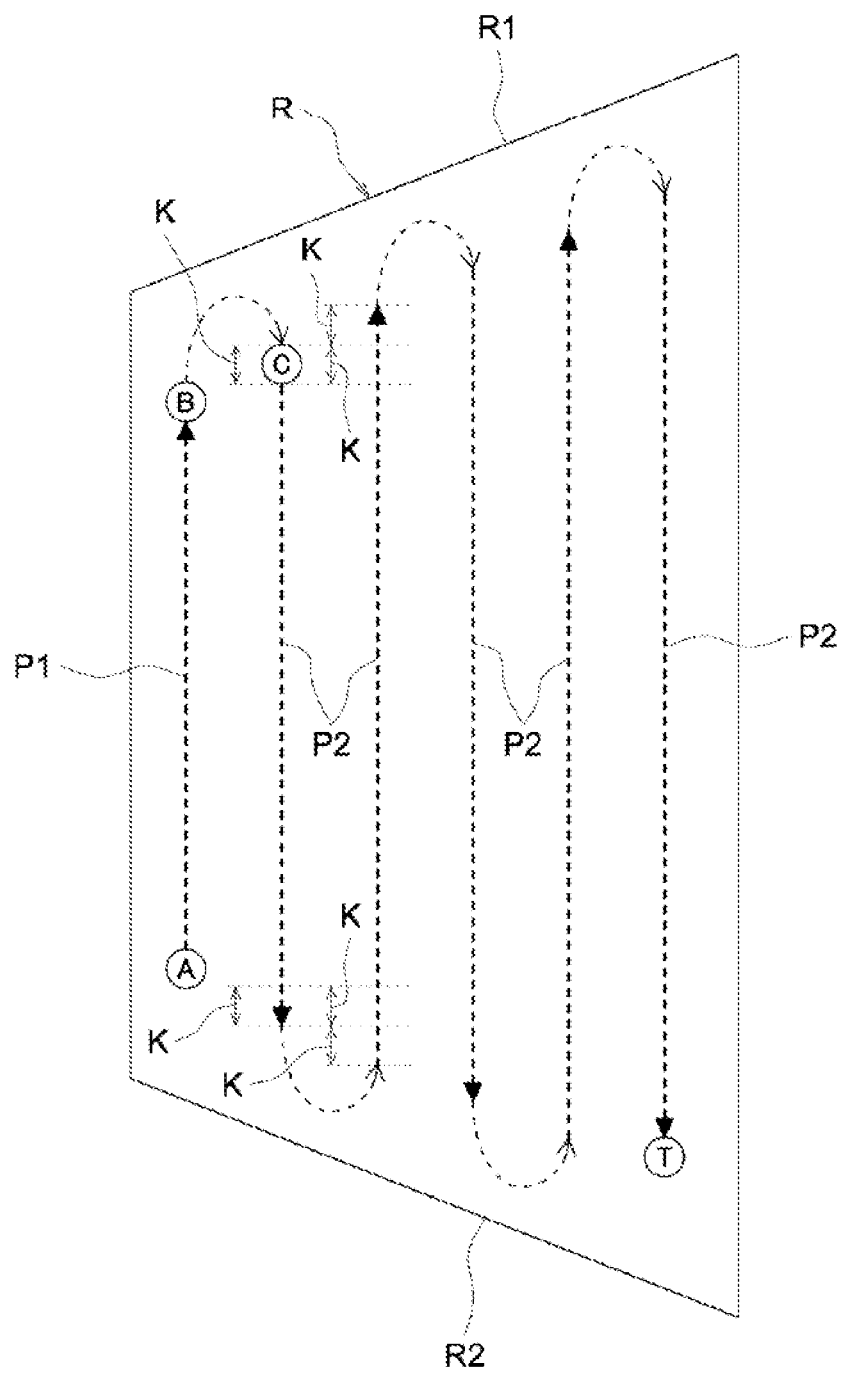
FIG. 14 is a diagram illustrating a work area in a state where a target travel path has been generated in a third embodiment.

In the first embodiment, as illustrated in FIG. 3 or the like, a case where the work area R has a rectangular shape is illustrated, but in the third embodiment, for example, as illustrated in FIG. 14, the shape of the work area R is a trapezoidal shape whose parallel sides face laterally such that a narrow one of the parallel sides is in a left side in FIG. 14 and a wide one of the parallel sides is in a right side in FIG. 14. In this case, the point C can be registered in a side closer to an end R1 (upper end portion in the FIG. 14) of the work area R than the point B. Even when the point C is registered in the above-described manner, the end R1 of the work area R is inclined upward as proceeding rightward, and therefore, a distance between the end R1 of the work area R and the point B opposing to each other and a distance between the end R1 of the work area R and the point C opposing to each other can be made the same.

The travel path generation section 54 can grasp the shape of the work area R from the work area information acquired by the work area information acquisition section 58 and generates, after grasping the shape of the work area R, the target travel path P. At this time, when the plurality of parallel paths P2 parallel to the first reference line P1 are generated, the parallel paths P2 are generated such that the length of each of the parallel paths P2 is larger by a set length 2K than that of an adjacent one of the parallel paths P2 in a direction going away from the first reference line P1. The set length 2K for the parallel path P2 can be set based on, for example, a distance K between the point B and the point C in a direction extending along the first reference line P1, and a distance twice larger than the distance K between the point B and the point C in the direction extending along the first reference line P1 can be set as the set length (2K). For example, the first parallel path P2 adjacent to the first reference line P1 is a path longer than the first reference line P1 by the set length 2K, and the next second parallel path P2 is longer than the first reference line P1 by a length twice the set length (4K). By generating the parallel paths P2 in the above-described manner, a straight line connecting one ends (upper ends in FIG. 14) of the parallel paths P2 is parallel to the end R1 of the inclined work area R, and a straight line connecting the other ends (lower ends in FIG. 14) of the parallel paths P2 is parallel to an end R2 of the inclined work area R. Therefore, it is possible to generate the parallel paths P2 in accordance with the shape of the work area R.

Figure 15:
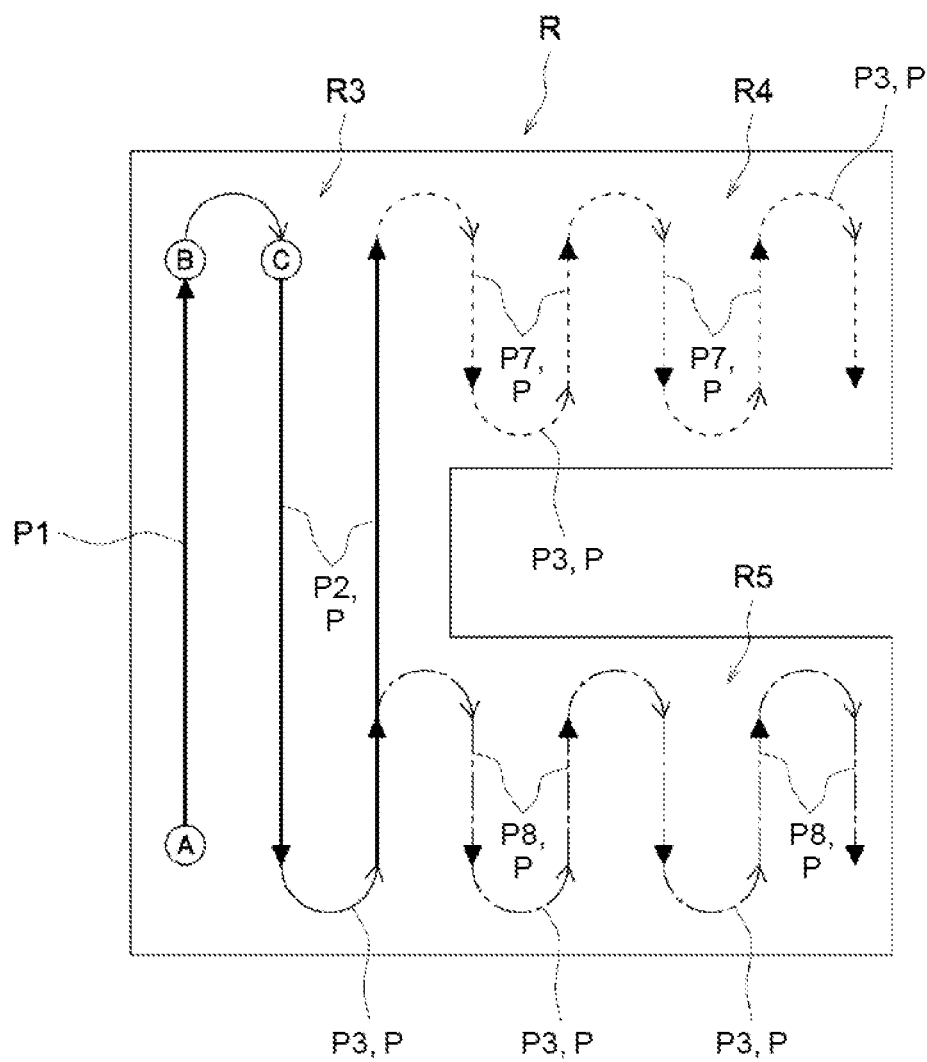
FIG. 15 is a diagram illustrating a work area when generating a target travel path in the third embodiment.
Figure 16:
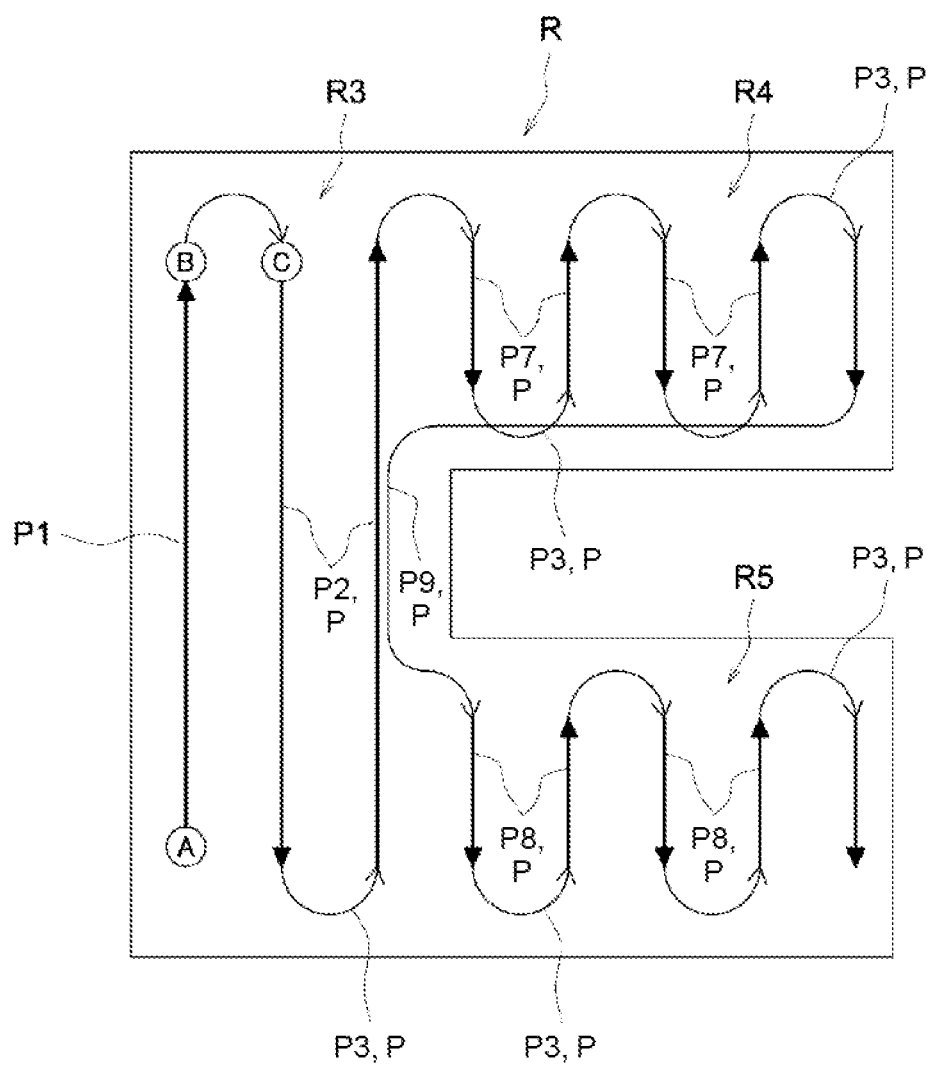
FIG. 16 is a diagram illustrating a work area when generating a target travel path in the third embodiment.

Moreover, as illustrated in FIG. 15, the shape of the work area R may be a U-shape having a wide area R3 and a pair of narrow areas R4 and R5 and facing laterally. In this case, when the travel path generation section 54 generates the target travel path P, the travel path generation section 54 provisionally generates a plurality of the target travel paths P as candidates, and the user or the like can select which target travel path among the target travel paths P is to be generated. For example, as illustrated in FIG. 15, a first candidate is a target travel path P indicated by a solid line, a second candidate is a target travel path P indicated by a solid line and a dotted line, and a third candidate is a target travel path P indicated by a solid line and an alternate long and short dash line, and as illustrated in FIG. 16, a fourth candidate is a target travel path P indicated by a solid line. As indicated by the solid line in FIG. 15, the first candidate is the target travel path P provisionally generated only in the wide area R3 of the work area R. As illustrated by the solid line and the dotted line in FIG. 15, the second candidate is the target travel path P provisionally generated only in the wide area R3 and the narrow area R4 on one side (upper side) of the work area R. In the narrow area R4, a parallel path P7 having a length that is shorter than that of the parallel path P2 in the wide area R3 and corresponds to a width (up-down width in FIG. 15 and FIG. 16) of the narrow area R4 is generated. As illustrated by the solid line and the alternate long and short dash line in FIG. 15, the third candidate is the target travel path P provisionally generated only in the wide area R3 and the narrow area R5 on the other side in the work area R. In the narrow area R5, a parallel path P8 having a length that is shorter than that of the parallel path P2 in the wide area R3 and corresponds to a width (up-down width in FIG. 15 and FIG. 16) of the narrow area R5 is generated. As illustrated by the solid line in FIG. 16, the fourth candidate is the target travel path P provisionally generated over the entire work area R including the wide area R3 and the pair of narrow areas R4 and R5. In this fourth candidate, a connecting path P9 connecting the narrow area R4 on the upper side and the narrow area R5 on the lower side is generated.

In a case where the user or the like selects one target travel path P from the plurality of candidates, for example, the display section 51 of the mobile communication terminal 3 can display the target travel paths P of the first to fourth candidates such that the target travel paths P of the first to fourth candidates can be identified, and one target travel path P can be selected by the user or the like by operating the display section 51. When one target travel path P is selected by the user or the like, the travel path generation section 54 generates the selected target travel path P as a path on which automatic traveling is performed.

Other Embodiments

Other embodiments of the present invention will be described. Note that a configuration of each embodiment described below can be applied not only independently but also in combination with a configuration of another embodiment.

(1) Various changes can be made to the configuration of the work vehicle.

For example, the work vehicle may be configured to have a hybrid specification including an engine 9 and an electric motor for traveling, and may be configured to have an electric specification including an electric motor for traveling, instead of the engine 9.

For example, the work vehicle may be configured to have a semi-crawler specification including left and right crawlers, instead of the left and right rear wheels 6, as a traveling unit.

For example, the work vehicle may be configured to have a rear wheel steering specification in which the left and right rear wheels 6 function as steering wheels.

(2) In the first embodiment, the travel path generation section 54, the reference point setting section 56, the work area information acquisition section 58, the notification position specification section 59, and the like are provided in the mobile communication terminal 3, but the travel path generation section 54, the reference point setting section 56, the work area information acquisition section 58, the notification position specification section 59, and the like can be provided in the tractor 1 and can be provided in an external management device, and arrangement locations thereof can be changed as appropriate.

INDUSTRIAL APPLICABILITY

The present invention is applicable to various path generation systems that generate a target travel path on which a work vehicle is caused to automatically travel.

DESCRIPTION OF REFERENCE NUMERALS

1 Tractor (work vehicle)
54 Travel path generation section
56 Reference point setting section
58 Work area information acquisition section
59 Notification position specification section
186 End notification control section
P Target travel path
P1 First reference line
P2 Parallel path
P4 Second reference line
P5 Additional path
P6 Additional path
R Work area

The invention claimed is:

1. A path generation system comprising:
a travel path generation section configured to generate a target travel path on which a work vehicle is caused to automatically travel; and
a reference point setting section configured to set a first reference point and a second reference point used for generation of a first reference line and a third reference point used to set intervals, based on position information of the work vehicle when the work vehicle is caused to travel, and
wherein the travel path generation section is configured to:
generate, as the target travel path, a path including a plurality of parallel paths parallel to the first reference line based on the first reference point and the second reference point; and
set an interval between the first reference line and one of the parallel paths and an interval between the parallel paths, based on a distance between the second reference point and the third reference point.

2. The path generation system of claim 1, wherein the reference point setting section is configured to set, based on an operation of an operation tool provided in the work vehicle, the first reference point, the second reference point, and the third reference point.

3. The path generation system of claim 1, wherein the reference point setting section is configured to set, based on a behavior state of the work vehicle, the first reference point, the second reference point, and the third reference point.

4. The path generation system of claim 1, further comprising:
a work area information acquisition section configured to acquire work area information related to a work area to which the first reference point, the second reference point, and the third reference point belong, and
wherein the travel path generation section is configured to generate the target travel path in a work area specified by the work area information acquired by the work area information acquisition section.

5. The path generation system of claim 4, further comprising:

a notification position specification section configured to specify, based on the first reference point, the second reference point, and the work area information, a notification position where an end notification is initiated to notify that the work vehicle is in an approach state with respect to an end of the work area; and
an end notification control section configured to, in a case where the work vehicle automatically travels, when a current position of the work vehicle reaches the notification position, perform the end notification.

6. The path generation system of claim 1, wherein:
the reference point setting section is configured to set a fourth reference point used for generating a second reference line different from the first reference line, based on the position information of the work vehicle when the work vehicle is caused to travel, and
the travel path generation section is further configured to:
select one of the first reference line and the second reference line when a predetermined condition is satisfied; and
generate, as the target travel path, a path including an additional path parallel to the one of the first reference line and the second reference line selected based on a current position of the work vehicle.

7. An apparatus comprising:
a control unit configured to:
receive position information of a work vehicle that corresponds to a path traveled by the work vehicle;
determine a first reference point, a second reference point, and a third reference point based on the position information;
determine a first reference path based on the first and second reference points; and
determine a target travel path configured to be used by the work vehicle for autonomous travel, wherein the target travel path includes a plurality of paths including the first reference path, wherein each of the plurality of paths is parallel to the first reference path, and wherein a distance between each of the plurality of paths is based on a distance between the second reference point and the third reference point.

8. The apparatus of claim 7, wherein the first reference point, the second reference point, and the third reference point are determined based additionally on an indication from a user of the work vehicle.

9. The apparatus of claim 7, wherein the first reference point, the second reference point, and the third reference point are determined based additionally on a signal indicating operation of a mechanism of the work vehicle.

10. The apparatus of claim 7, wherein the control unit is further configured to:
acquire information associated with a work area within which the first reference point, the second reference point, and the third reference point are disposed,
wherein the target travel path that is determined is disposed within the work area.

11. The apparatus of claim 7, wherein the plurality of paths correspond to portions of a work area on which the work vehicle performs work.

12. The apparatus of claim 11, wherein the target travel path further includes a plurality of turns that connect adjacent paths of the plurality of paths, and wherein the plurality of turns correspond to portions of the work area on which the work vehicle does not perform work.

* * * * *